United States Patent
Schiffman et al.

(10) Patent No.: US 10,709,265 B2
(45) Date of Patent: *Jul. 14, 2020

(54) INTERACTIVE DISPLAY CASE

(71) Applicant: PERCH INTERACTIVE, INC., New York, NY (US)

(72) Inventors: Jared Schiffman, New York, NY (US); Phillip Tiongson, New York, NY (US)

(73) Assignee: PERCH INTERACTIVE, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/119,196

(22) Filed: Aug. 31, 2018

(65) Prior Publication Data
US 2019/0021517 A1 Jan. 24, 2019

Related U.S. Application Data

(63) Continuation of application No. 15/659,316, filed on Jul. 25, 2017, now Pat. No. 10,085,571.

(Continued)

(51) Int. Cl.
| G09G 5/00 | (2006.01) |
|---|---|
| A47F 3/04 | (2006.01) |
| G06F 3/0488 | (2013.01) |
| A47F 3/00 | (2006.01) |
| G06F 3/14 | (2006.01) |
| A47F 11/06 | (2006.01) |
| G09G 5/39 | (2006.01) |
| G06F 1/16 | (2006.01) |
| A47F 10/00 | (2006.01) |
| A47F 10/02 | (2006.01) |

(52) U.S. Cl.
CPC ............ A47F 3/0478 (2013.01); A47F 3/001 (2013.01); A47F 3/0469 (2013.01); A47F 10/00 (2013.01); A47F 11/06 (2013.01); G06F 1/1605 (2013.01); G06F 3/0488 (2013.01); G06F 3/14 (2013.01); G09G 5/39 (2013.01); A47F 2010/005 (2013.01); A47F 2010/025 (2013.01)

(58) Field of Classification Search
CPC ..... G06T 19/006; G06T 17/00; G06F 3/0484; G06F 3/017; G06F 3/0421; G06F 3/147; G09G 2354/00; G09G 2300/023; G09G 2340/0464; G09G 2380/04
See application file for complete search history.

(56) References Cited

U.S. PATENT DOCUMENTS

| 2014/0164190 A1* | 6/2014 | Schiffman ......... G06Q 30/0641 705/27.1 |
| 2015/0206188 A1* | 7/2015 | Tanigawa ........... G06Q 30/0261 705/14.58 |

OTHER PUBLICATIONS

Sukaviriya et al. ("Embedding Interactions in a Retail Store Environment: The Design and Lessons Learned", Published in INTERACT 2003. https://www.semanticscholar.org/paper/Embedding-Interactions-in-a-Retail-Store-The-Design-Sukaviriya-Podlaseck/165c3270003f4c3953f3c43a539e00a785b50283 (Year: 2003).*

* cited by examiner

Primary Examiner — Hau H Nguyen
(74) Attorney, Agent, or Firm — Cahn & Samuels, LLP.

(57) ABSTRACT

An interactive display case having a first frame, a plurality of storage areas within the first frame, a second frame, and processing circuitry. The processing circuitry is configured to detect an object passing through the interior of the second frame, identify an area within the interior of the second frame in which the object passes, where the area corresponding to one of the storage areas, and generate interaction data corresponding to the identified area.

21 Claims, 33 Drawing Sheets

Related U.S. Application Data

(60) Provisional application No. 62/367,032, filed on Jul. 26, 2016.

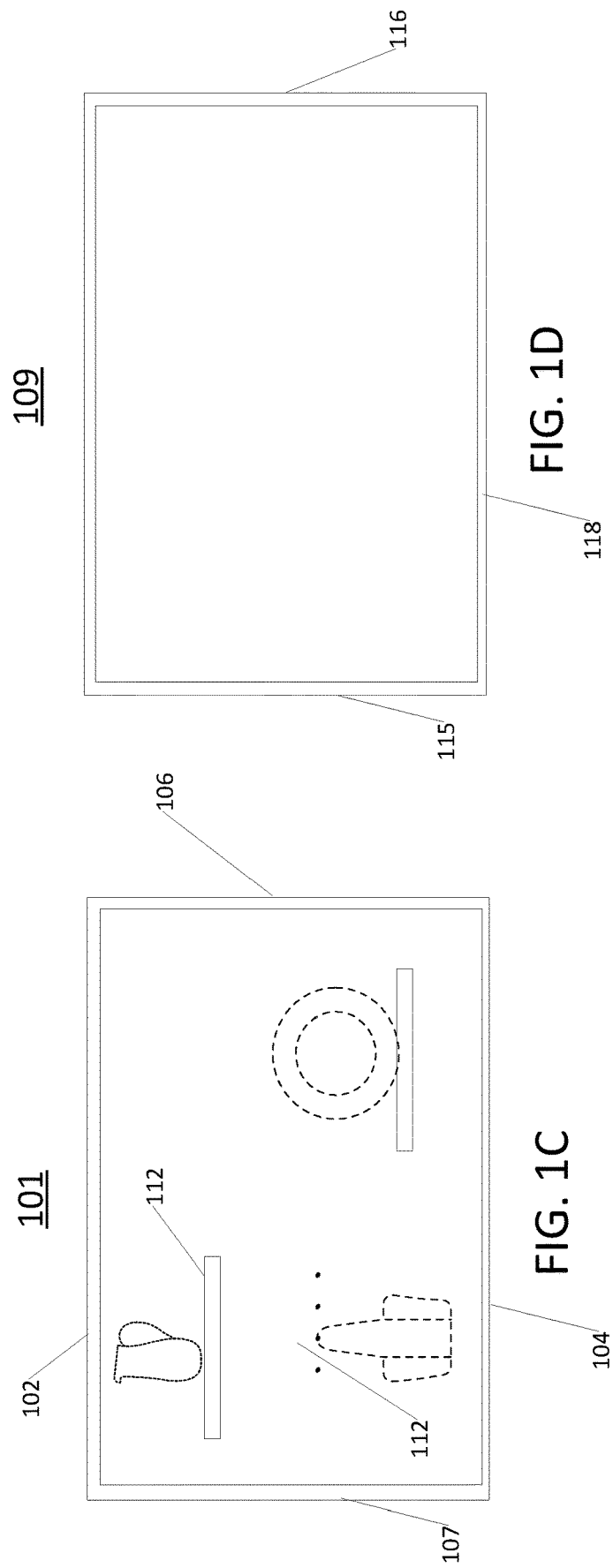

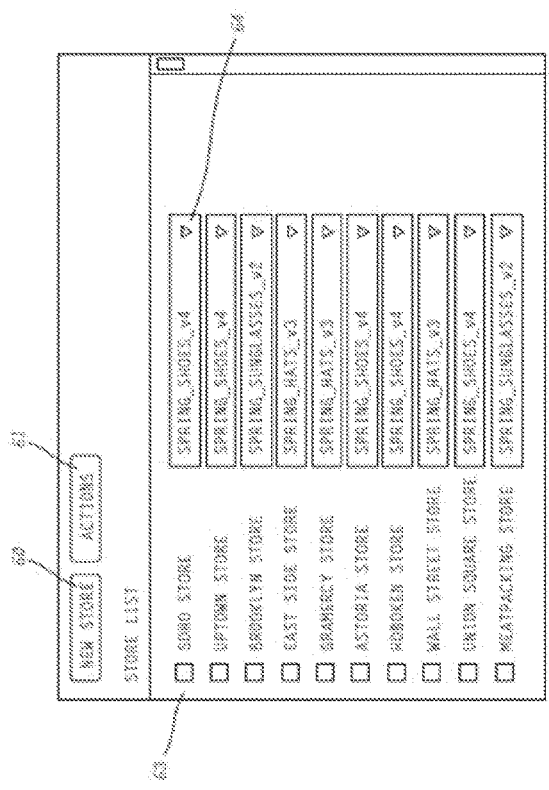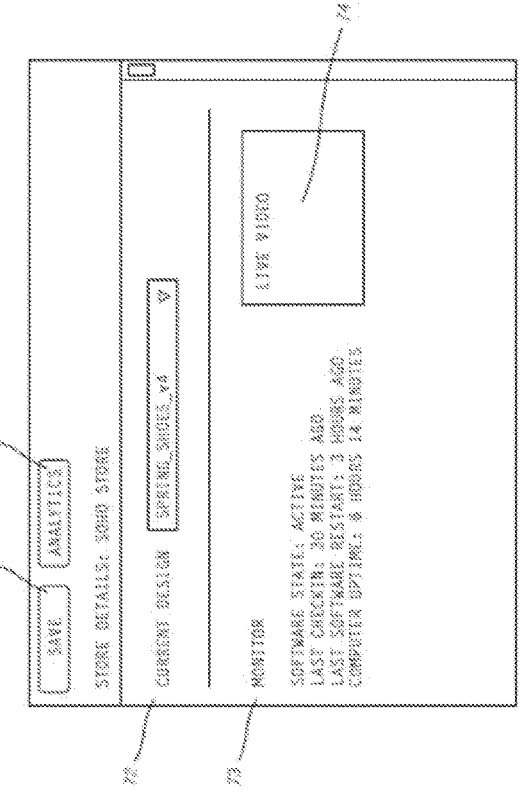
FIG. 9
FIG. 12
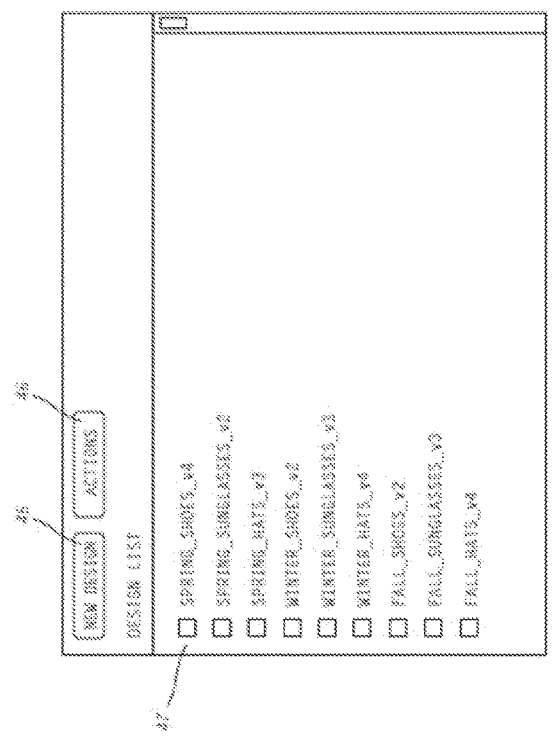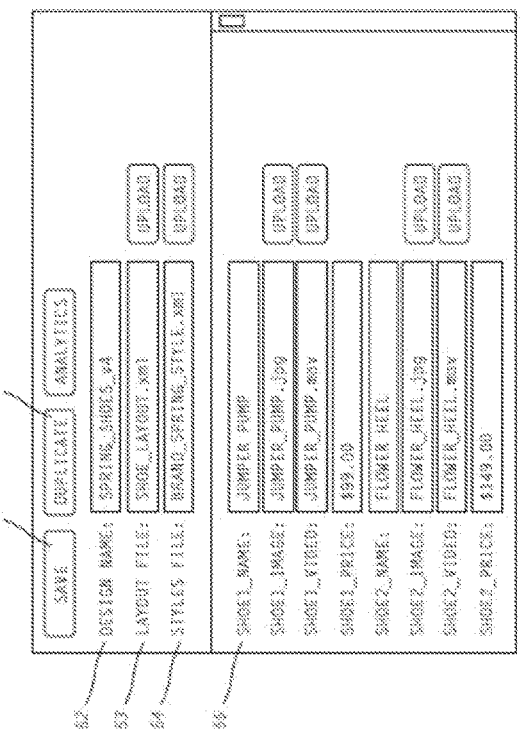
FIG. 11
FIG. 10

300

INTERACTIVE DISPLAY CASE

CROSS-REFERENCE TO RELATED APPLICATIONS

This application claims priority to U.S. Provisional Application No. 62/367,032, filed Jul. 26, 2016, and U.S. application Ser. No. 15/659,316, each of which is herein incorporated by reference in its entirety for all purposes.

BACKGROUND

In stores, numerous products are displayed on shelves, in glass cases, on peg boards, etc. Consumers typically enter a retail store and browse the selection of products shown on the display cases. Some products include their own packaging having additional information about the products, but even that information is limited to the size of the product package. Further, this information may not be fully up to date as it was created before distribution of the product.

SUMMARY OF THE INVENTION

An interactive display case having a first frame, a plurality of storage areas within the first frame, a second frame, and processing circuitry. The processing circuitry is configured to detect an object passing through the interior of the second frame, identify an area within the interior of the second frame in which the object passes, where the area corresponding to one of the storage areas, and generate interaction data corresponding to the identified area.

Further described is a storage system, a multi-touch sensing frame and processing circuitry to execute special purpose software. The multi-touch sensing frame detects when a hand passes through and outputs coordinates for the hand's location. These coordinates are processed by the circuitry with respect to a digital representation of the storage system layout. Through a process of iteration over all storage areas, the processing circuitry determines and outputs interaction data based on the coordinate data and digital representation, as well as the time that the interaction took place.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1C is a front view of an alternative arrangement of the first interactive display case according to one example.

FIG. 1D illustrates a sensing frame according to one example.

FIG. 9 illustrates a first screen of a user interface associated with software used to design a planogram layout according to one example.

FIG. 10 illustrates a second screen of a user interface associated with software used to design a planogram layout according to one example.

FIG. 11 illustrates a third screen of a user interface associated with software used to design a planogram layout according to one example.

FIG. 12 illustrates a fourth screen of a user interface associated with software used to design a planogram layout according to one example.

DETAILED DESCRIPTION

Figure 1B:
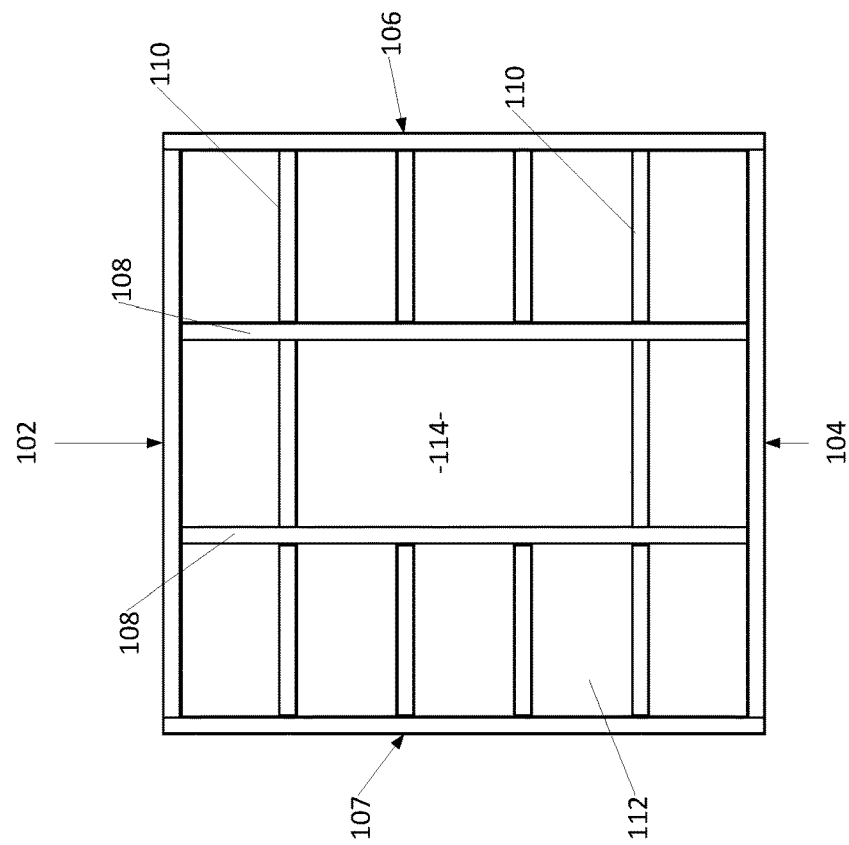
FIG. 1B is a front view of the first interactive display case according to one example.

Referring now to the drawings, wherein like reference numerals designate identical or corresponding parts throughout the several views.

Figure 1A:
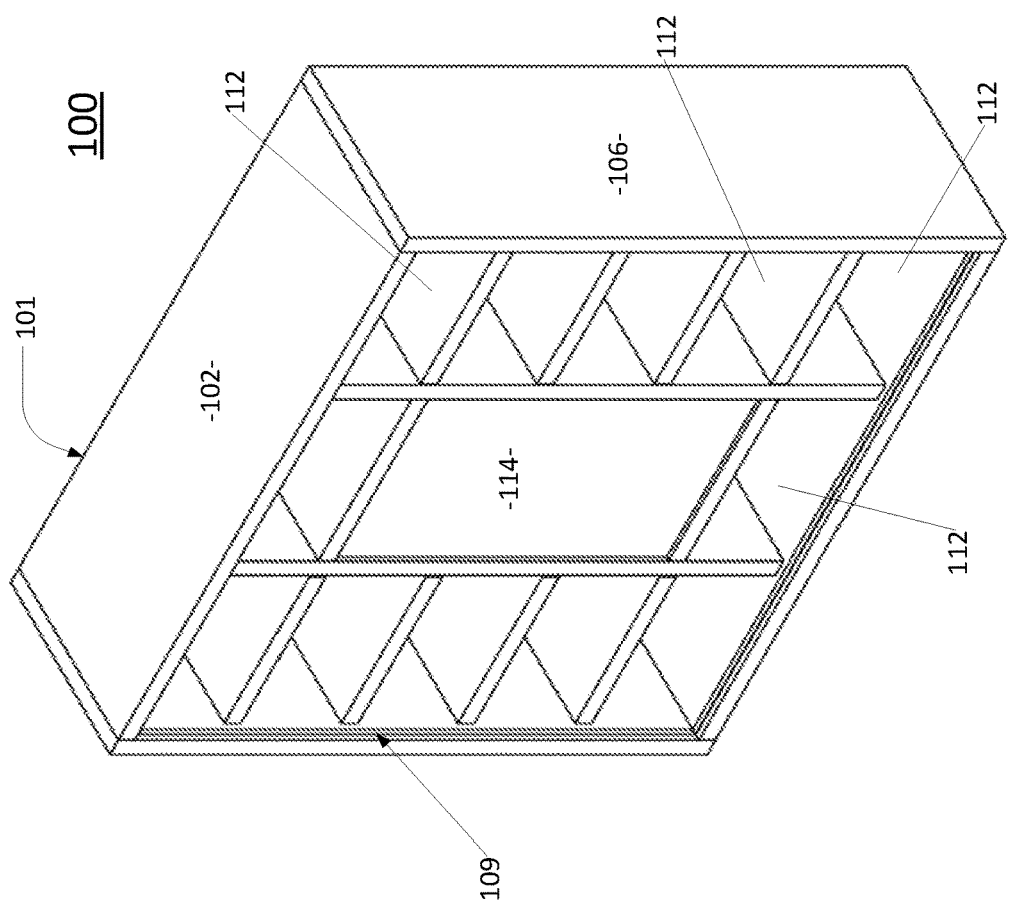
FIG. 1A is an isometric view of a first interactive display case according to one example.

FIGS. 1A, 1B, and 1C illustrate an interactive display case 100, or display case 100, according to one example. The display case 100 includes a frame 101, storage units or storage areas 112 allocated within the frame 101, a display device 114 and a sensing frame 109.

The frame 101 can be any type of shelving system, product display case, hanging product display case, temperature controlled display case, and any other type of container that can store and display products for consumers to view as would be understood by one of ordinary skill in the art. The storage areas 112 can be distributed equally within the frame 101 of the display case 100 or may be sized differently according to a planogram layout of products within the display case 100.

Figure 16:
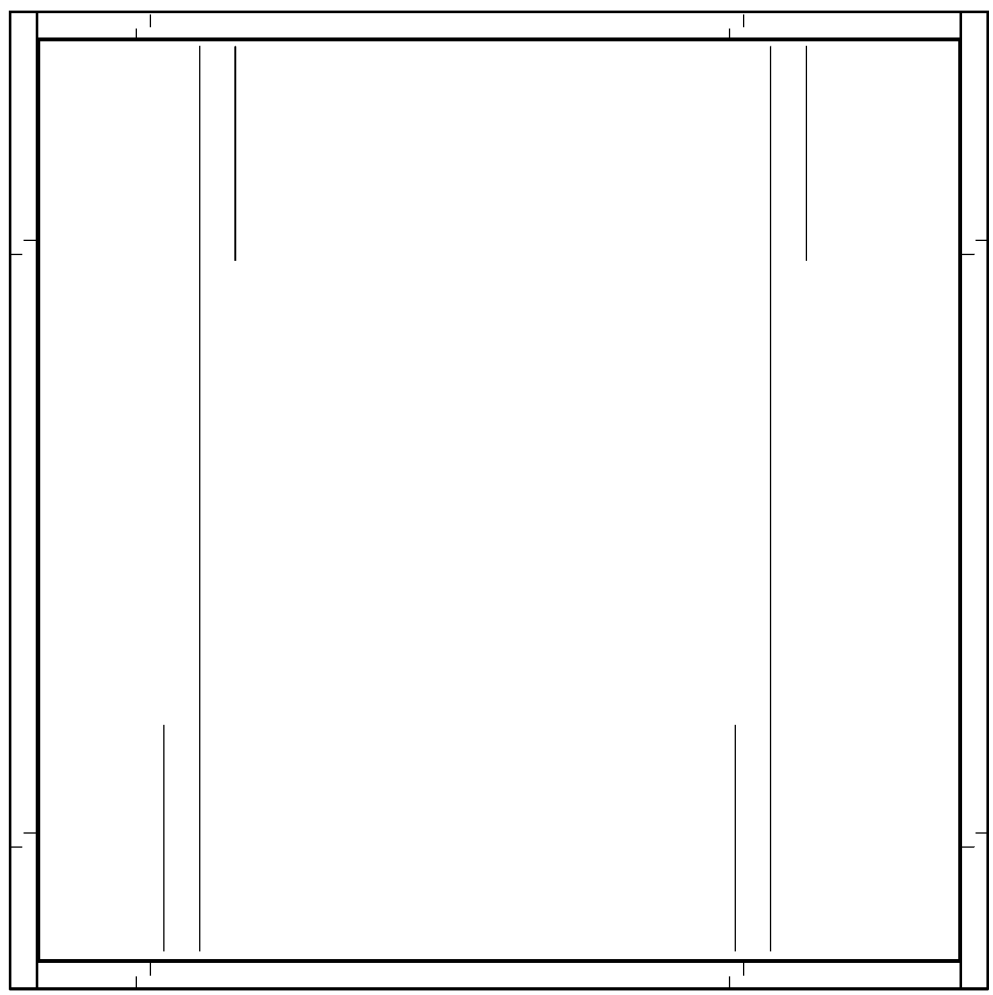
Figure 17:
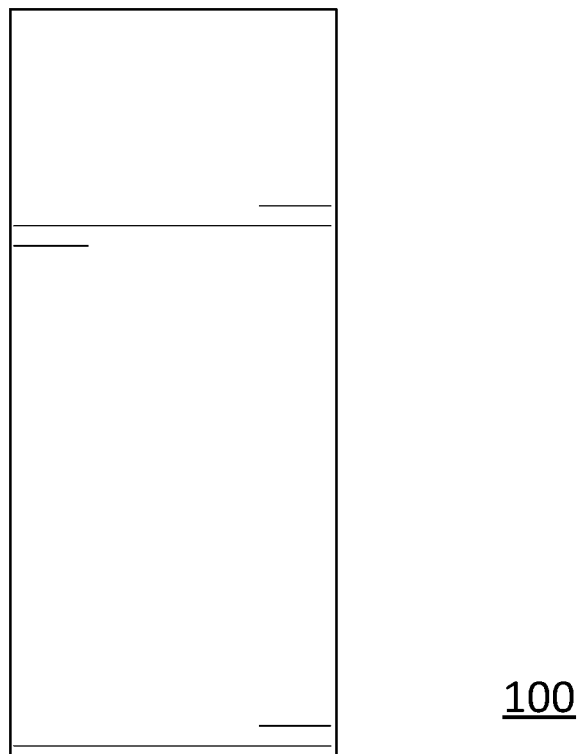
Figure 18:
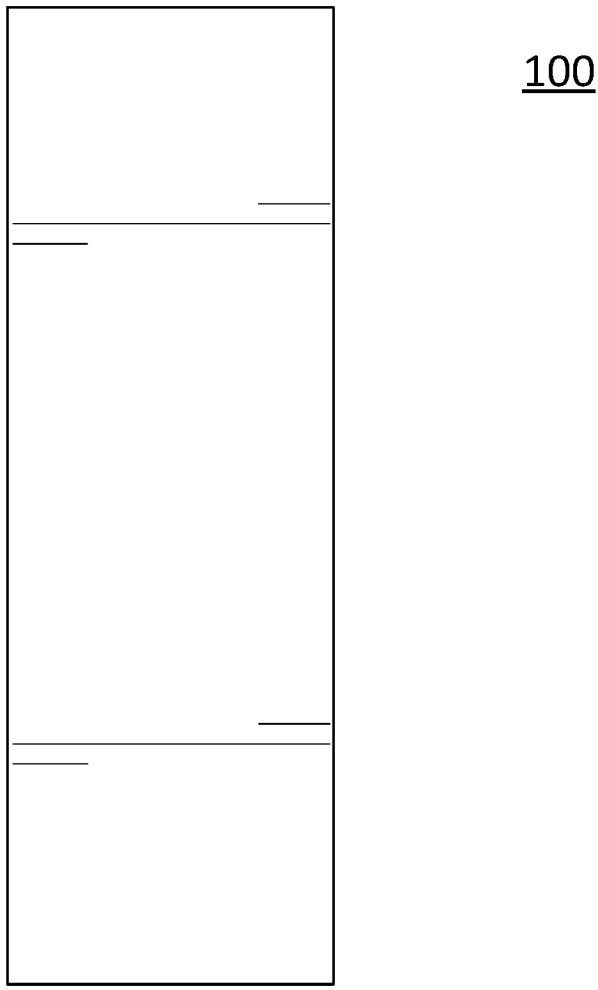
Figure 19:
Figure 20:

The frame 101 includes a top panel 102, a bottom panel 104, a first side panel 106 and a second side panel 107. The frame 101 also includes a plurality of vertical panels 108 secured to the top panel 102 and bottom panel 104, and a plurality of horizontal panels 110 disposed between the vertical panels 108 and/or side panels 106, 107 and secured to the vertical panels 108 and/or side panels 106, 107. The top panel 102, bottom panel 104, side panels 106, 107, horizontal panels 110, and vertical panels 108 combine to form a plurality of storage areas 112. In one example, the storage areas 112 can be designed to store one or more products such as clothing or accessories. In some examples, the frame 101 may include a rear wall 103 (see FIG. 16 which is a rear view of the display case 100) to enclose the back of the plurality of storage areas 112 in order to prevent products from falling out of the rear of the frame or to present a pleasing background behind the displayed products. In some aspects described herein, such as in FIG. 2C, the rear wall may be the display device 114.

The horizontal panels 110 can be secured to the vertical panels 108 and/or side panels 106, 107 using any method known in the art including using nails, screws, brackets, pins, adhesive, slot and grooves, and so forth. The horizontal panels 110 can be placed at any vertical height along the vertical panels 108 and/or side panels 106, 107 to create larger or smaller storage areas 112 or to create storage areas 112 of varying size within a single frame 101. In other aspects, the frame 101 may consist of only horizontal panels 110 that are connected to a rear wall. The number of horizontal panels 110 can be increased to create more storage areas 112 or decreased to create fewer storage areas 112.

Alternatively, the frame 101 can be a hanging product display case. The hanging product display case may not have horizontal panels 110 or vertical panels 110 disposed between the top panel 102, bottom panel 104, and side panels 106, 107. Instead, the hanging product display case may include peg board and hooks to hang products on. Alternatively, the frame 101 can include a combination of horizontal and vertical panels for product storage and a peg board or other structures for hanging products.

The display device 114 is an electronic display unit connected to processing circuitry, such as that of a computer, which controls the display device 114. The display device 114 is preferably a touch-sensing display unit as would be understood by one of ordinary skill in the art.

Alternatively, the frame 101 can include a single storage area 112 formed by the inner surfaces of the top panel 102, bottom panel 104, and side panels 106, 107 or multiple unenclosed storage areas 112. The one or more storage areas 112 may include pegs or hooks used to hang products on an inner surface of the top panel 104 and/or side panels 106, 107, shelves connected to the rear wall of the frame 101 and/or the enclosed storage areas illustrated in FIG. 1A. Therefore, various types of storage areas 112 are contemplated and can be arranged in a variety of different combinations.

For example, FIG. 1C illustrates an interactive display case 100 having a variety of different storage areas. In this example, the frame 101 does not include any enclosed storage areas as illustrated in FIG. 1A but rather includes shelved storage areas and pegs with hooks for holding various products. Therefore, the term storage area 112 represents a particular location or area within the frame 101 that stores a certain product. Thus, in this example, the frame 101 includes three storage areas 112 that extend within X, Y and Z directions within the frame 101.

FIG. 1D illustrates the sensing frame 109 according to one example. The sensing frame can be applied to the interactive display case 100 and be of varying size such as with interactive display cases 200, 300 described further herein. The sensing frame 109 can be attached to a front portion of the frame 101 but behind the outermost front portion of the frame 101 thereby allowing the sensing frame 109 to remain hidden to the user. Alternatively, the sensing frame could be affixed on the outermost front portion of the frame 101. The sensing frame 109 includes an inner perimeter 116, an outer perimeter 115, a front surface 118, and a rear surface (not shown). The inner perimeter 116 corresponds to the interior of the sensing frame 109. The sensing frame 109 includes one or more sensors that allow the sensing frame 109 to detect a finger, hand or object passing through the plane of the sensing frame 109 into one of the storage areas 112 or contacting the display device 114. The sensor can be any kind of sensor including, but not limited to, IR, sonar, laser, passive IR, microwave, ultrasonic, vibration, image sensors, and so forth.

In one example, the sensing frame 109 is an IR sensing frame such as the "TouchFrame" produced by U-Touch USA Inc™. For this type of touch panel, infrared technology consists of infrared light emitting diodes (LEDs) and light sensors that are placed on the perimeter of the sensing frame 109. LEDs transmit beams of light that run parallel to an assigned light sensor to create a light grid. Any object that disrupts the light or reduces the light such as a finger or stylus will register as a touch and the sensors will distinguish coordinates within the sensing frame 109 at which the object passed within the inner perimeter 116 of the sensing frame 109. Processing circuitry of the sensing frame 109 or a connecting computer can then process this information as described further herein to acquired data of the interaction and alter the content displayed on the display device 114.

The outer perimeter 115 of the sensing frame 109 can be sized to correspond to the outer periphery of the frame 101 in order to give the overall device an integrated appearance. However, in some examples, the outer perimeter 115 of the sensing frame 109 can be larger or smaller than the outer periphery of the frame 101. If outer perimeter 115 of the sensing frame 109 is larger than the outer periphery of the frame 101, then the inner perimeter 116 of the sensing frame 109 is able to detect an object touching the front surface of the top panel 102, bottom panel 104, or side panels 106, 107 of the frame 101. Conversely, if the outer perimeter 115 of the sensing frame 109 is smaller or within than the outer of the frame 101, then objects touching portions of the frame 101 outside of the periphery of the sensing frame 109 will not be detected by the sensing frame 109. These portions of the frame 101 can be used to display additional products that are not included in the planogram layout or these portions can be used to store additional versions of products included in the planogram such as products of different colors, sizes, materials, etc. Therefore, the size of the sensing frame 109 can vary based on objectives for a particular interactive display case, based on reuse between frames and as a way to save on cost.

In certain aspects, the sensing frame 109 is affixed to periphery of the frame 101 such that the entire front surface area of the plurality of storage areas 112 is within the inner perimeter 115 of the sensing frame 109. Therefore, in one example, the outer 115 and inner perimeters 116 of the sensing frame 109 match the outer and inner perimeter formed by the front edges of the top 102, bottom 104, and side panels 106, 107 of the frame 101 so that the sensing frame 109 is flush with the outer and inner edge of the frame 101 and an object passing into any of the storage areas 112 can be detected.

Therefore, the sensing frame 109 includes a zone of detection (not shown) where the sensing frame 109 sensors are designed to detect movement within the zone of detection. This zone of detection corresponds to an area covered by the inner perimeter 116 of the sensing frame 109. The zone of detection is technically a three dimensional zone, but the third dimension (thickness or depth) can be very small. Thus, the zone of detection can be substantially a two-dimensional plane within the inner perimeter 116 of the sensing frame 109.

As discussed herein, if the sensing frame 109 detects an interruption of light from the LEDs caused by an object within the zone of detection of the sensing frame 109, processing circuitry can detect the location within the inner perimeter 116 based on the sensor information and identify coordinates of this interaction. The sensing frame 109 can also detect and locate multiple objects passing through the zone of detection at the same time.

FIGS. 1A and 1B show the display device 114 located at the center of the frame 101, but the display device 114 can be located anywhere on the frame 101 via rearrangement of the panels and thus a display device 114 of any size can be used in the invention.

FIG. 1B shows the display device 114 abutting against the surfaces of the surrounding horizontal panels 110 and vertical panels 108 in order to maximize the storage space available on the frame 101. In some aspects, there can be a gap between one or more outer edges of the display device 114 and the surrounding horizontal panels 110 and vertical panels 108 in order to vent and cool the display device 114. Alternatively, the display device 114 can be left out of the interactive display case 100 entirely and an additional storage area 112 can be utilized within this space. In the case where the display device 114 is left out of the display case 100, the display device 114 could be attached separately from the interactive display case 100 to perform the functions herein or could be left out of the system entirely. In either situation, the display case 100 will continue to function as described herein with respect to identifying interactions and storing data corresponding to the interactions.

Additionally, FIG. 1A shows that the display device 114 is slightly set back from the front surfaces of the surrounding vertical panels 108 and horizontal panels 110. This allows the sensing frame 109 to detect a hand, finger, or object moving past the plane of the sensing frame 109 and toward the display device 114 so that this interaction can be processed as described further herein. Preferably, the set back is large enough for the sensing frame 109 to detect that an object has moved entirely through the zone of detection, yet small enough that contact with the display device 114 is a practical certainty once the finger, hand, or object has moved through the sensing frame's zone of detection.

This set-back configuration allows the processing circuitry to detect when a user is about to touch the display device 114. Detecting this event can trigger the processing circuitry can turn on the display device's 114 touch capabilities, wake the display device 114 from a screen saver or sleep mode, or cause the display device 114 to show touch-selection options to the user. The event detection can also increase the response time of the display device 114 by pre-emptively waking from sleep mode or some other power-saving mode. Further, data statistics can be saved that indicate frequency of usage of the touch screen and other data related to the touch interactions with the display device 114. Similarly, display device 114 can send information with respect to specific touch interactions to the processing circuitry for data analysis and storage.

Figure 2B:
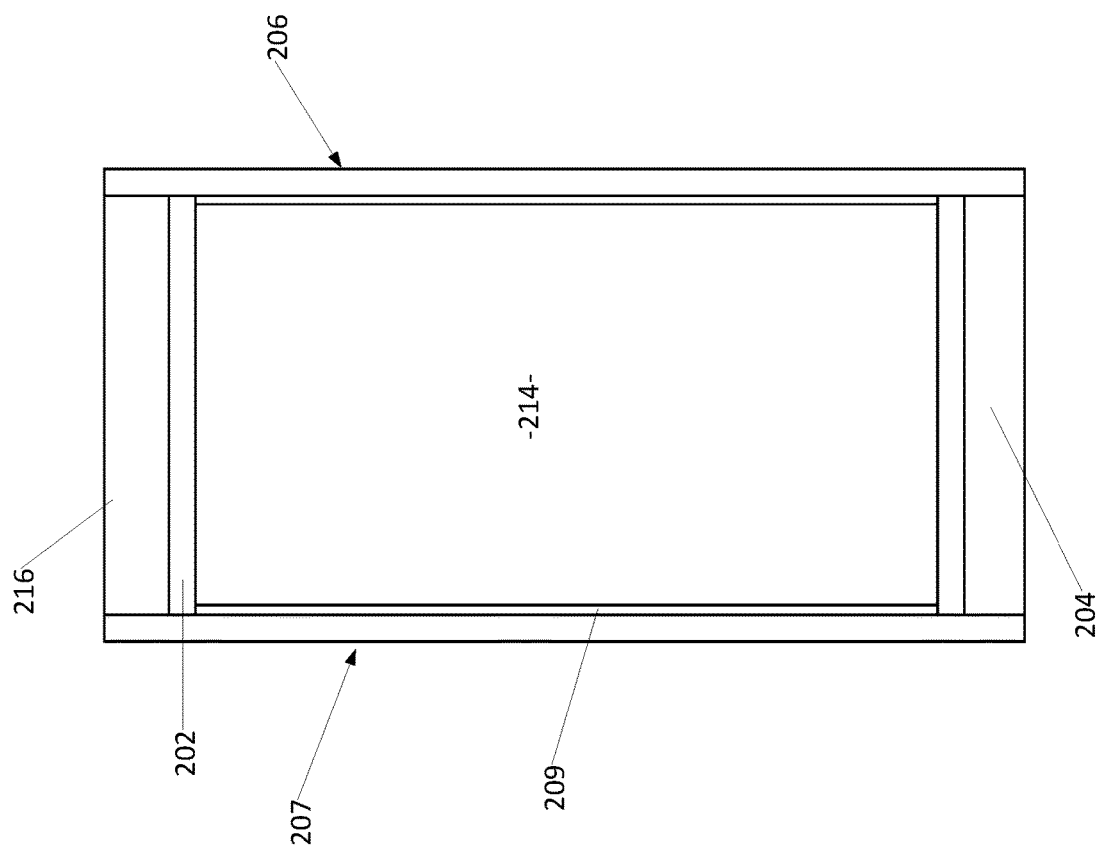
FIG. 2B is a front view of the second interactive display case according to one example.
Figure 2A:
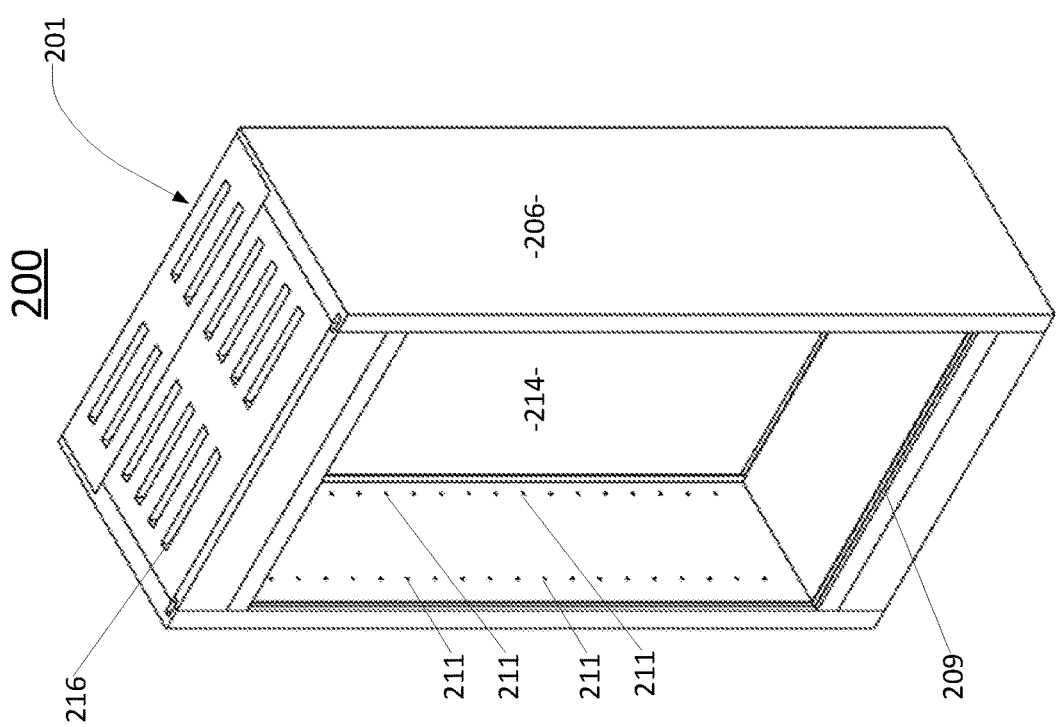
FIG. 2A is an isometric view of a second interactive display case according to one example.
Figure 2C:
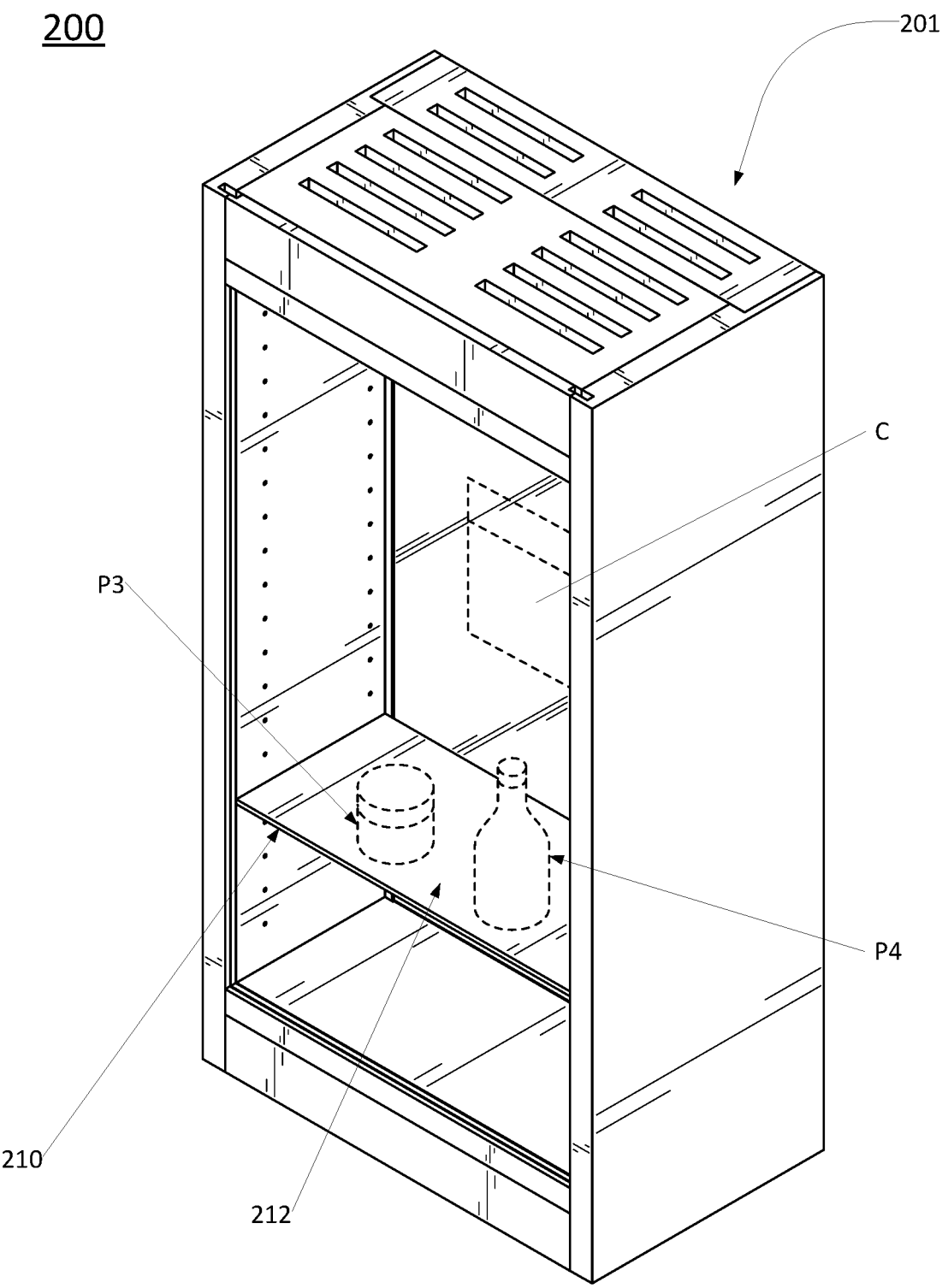
FIG. 2C illustrates the second interactive display case according to one example.

FIGS. 2A, 2B, and 2C illustrate a second interactive display case 200, or display case 200, according to one example. The interactive display case 200 includes a frame 201, sensing frame 209, and display device 214. Further, the interactive display case 200 includes temperature control unit 216, such as a cooler having vents as would be understood by one of ordinary skill in the art, configured to maintain a selected temperature of the interactive display case 200. Further, the interactive display case 200 may include a closeable front door (not shown) that seals the interactive display case 200 to maintain temperatures within the interactive display case 200.

The frame 201 includes a top panel 202, bottom panel 204, first side panel 106, and second side panel 207 which form the outer periphery of the frame. Not shown in FIGS. 2A and 2B but illustrated in FIG. 2C is a horizontal panel 210. Horizontal panels 210 are similar to the horizontal panels 110 described above. The side panels 206, 207 include a plurality of holes 211 arranged in a vertical pattern and the holes 211 are designed to receive shelf mounting hardware such as nails, screws, pegs, brackets, etc. The horizontal panels 210 are designed to be mounted to the holes 211 using the shelf mounting hardware. Any number of panels 210 can be used in the interactive display case 200 and the horizontal panels 210 can be placed at any height to create a plurality of storage areas 212.

As seen in FIGS. 2A, 2B and 2C, the display device 214 is mounted to the rear side of the frame 201 with the displaying surface of the display device 214 visible through the front of the frame 201. This configuration allows products P3, P4 to be placed on horizontal panels 210 with the display device 214 visible behind the products P3, P4. FIG. 2C illustrates an example of products P3, P4 placed on horizontal panel 210 in front of the display device 214. In this example, the display device 214 displays content C related to the products P3, P4 in the display case 200. The processing circuitry can control the display device 214 to display products based on what is available within the interactive product display 201 and/or based on interactions detected by the sensing frame 209.

Therefore, like with the interactive display case 100, the display case 200 includes a sensing frame 209 configured to detect a finger, hand, or object passing through the sensing frame into a storage area 212 of the frame 201. Thus, the sensing frame 209 is also configured to detect the location of any object passing through the frame. The sensing frame 209 can include any of the features described above and like description is omitted.

Figure 3:
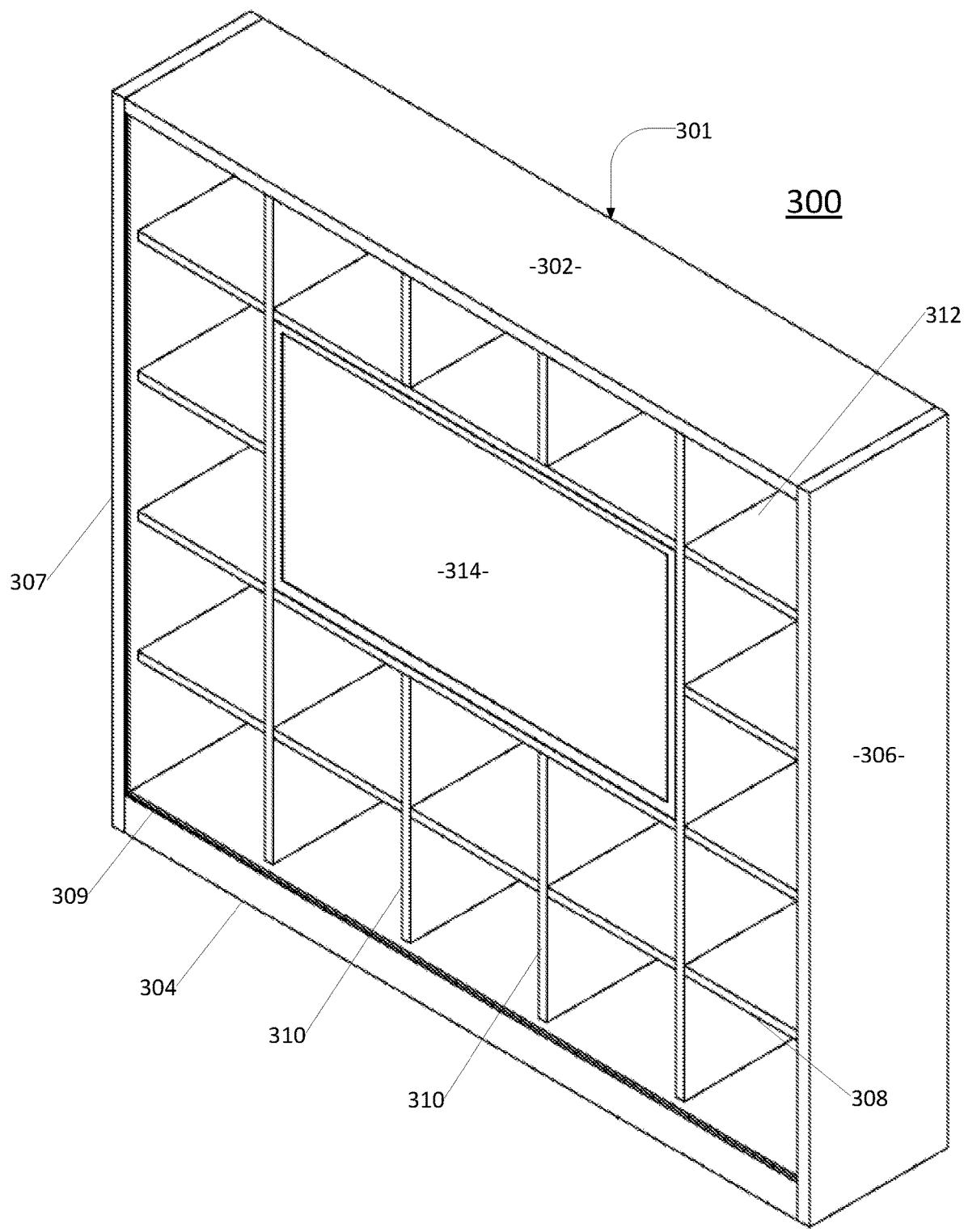
FIG. 3 is an isometric view of a third interactive display case according to one example.

FIG. 3 shows a third interactive display case 300, or display case 300, according to one example. Interactive display case 300 is similar to interactive display case 100 except that interactive display case 300 illustrates a larger size interactive display case having a different arrangement of storage areas 312 and display device 314. All other components of the interactive display case 300 are substantially the same as in the interactive display case 100 described above. The individual elements of interactive display case 300 are not described, but all reference numbers refer to similar components described above with respect to FIG. 1 and therefore like description is omitted.

In FIG. 3, it should be noted that the display device 314 is flush with the front most portion of the panels 308, 310. This provides a more integrated look and feel to provide an advantageous presentation to potential customers. It can also make the interactive display case 300 easier to construct.

As noted herein, each of interactive display cases 100, 200, and 300 is connected to or includes processing circuitry of computer architecture configured to detect interaction with the interactive display cases 100, 200, 300 via the sensing frame 109, 209, 309 and control the display device 114, 214, 314 based on the interaction. Moreover, processing circuitry configured to perform features described herein may be implemented in multiple circuit units (e.g., chips), or the features may be combined in circuitry on a single chipset, as shown on FIG. 4.

Figure 4:
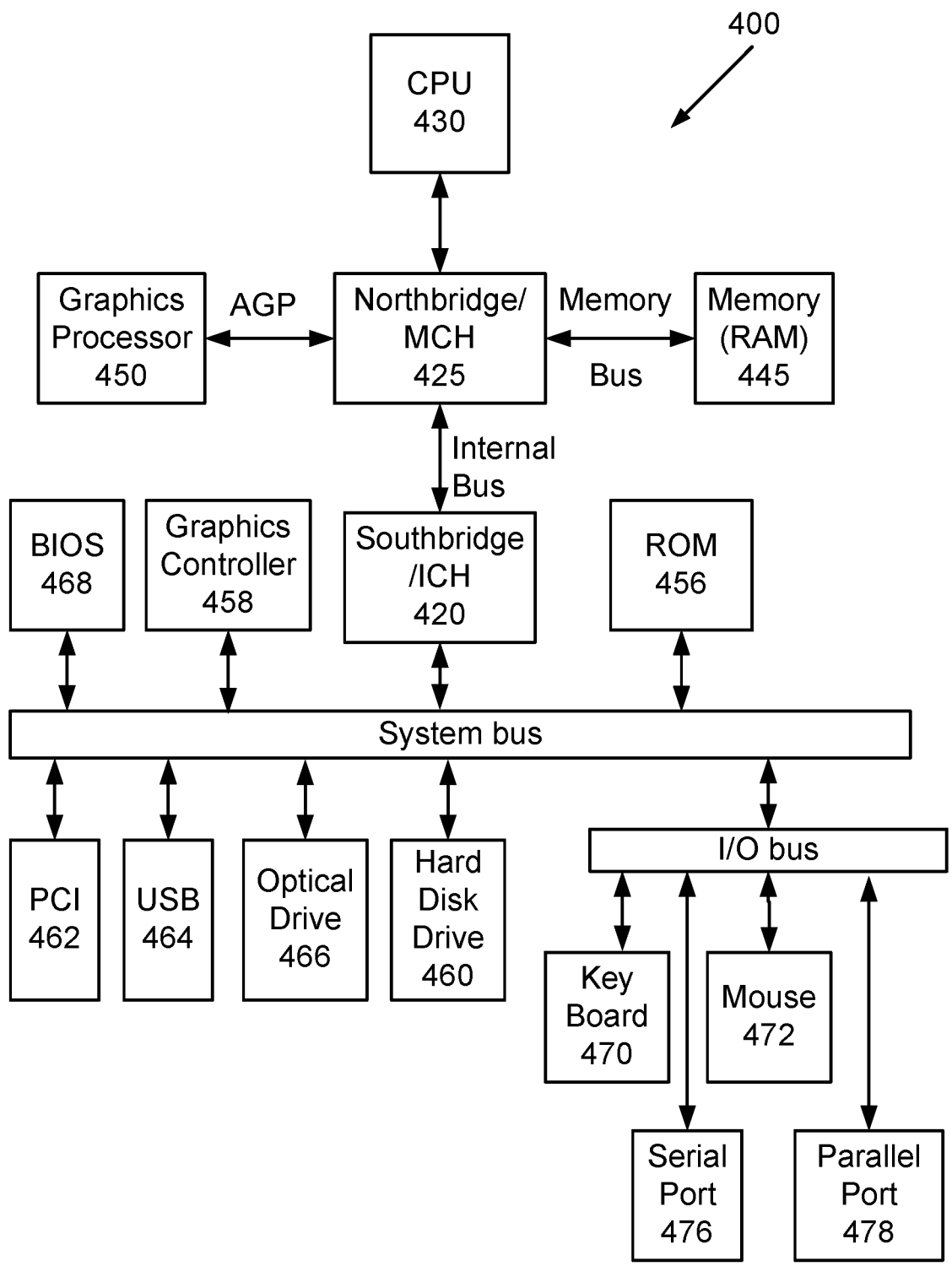
FIG. 4 illustrates a schematic diagram of a data processing system for controlling electronic features of the interactive display cases.

FIG. 4 shows a schematic diagram of a data processing system 400, according to certain examples, for controlling the interactive product display cases 100, 200, 300 as further described herein. The data processing system is an example of a computer in which code or instructions implementing the processes of the illustrative embodiments may be located.

In FIG. 4, data processing system 400 employs a hub architecture including a north bridge and memory controller hub (NB/MCH) 425 and a south bridge and input/output (I/O) controller hub (SB/ICH) 420. The central processing unit (CPU) 430 is connected to NB/MCH 425. The NB/MCH 425 also connects to the memory 445 via a memory bus, and connects to the graphics processor 450 via an accelerated graphics port (AGP). The NB/MCH 425 also connects to the SB/ICH 420 via an internal bus (e.g., a unified media interface or a direct media interface). The CPU Processing unit 430 may contain one or more processors and even may be implemented using one or more heterogeneous processor systems.

Figure 5:
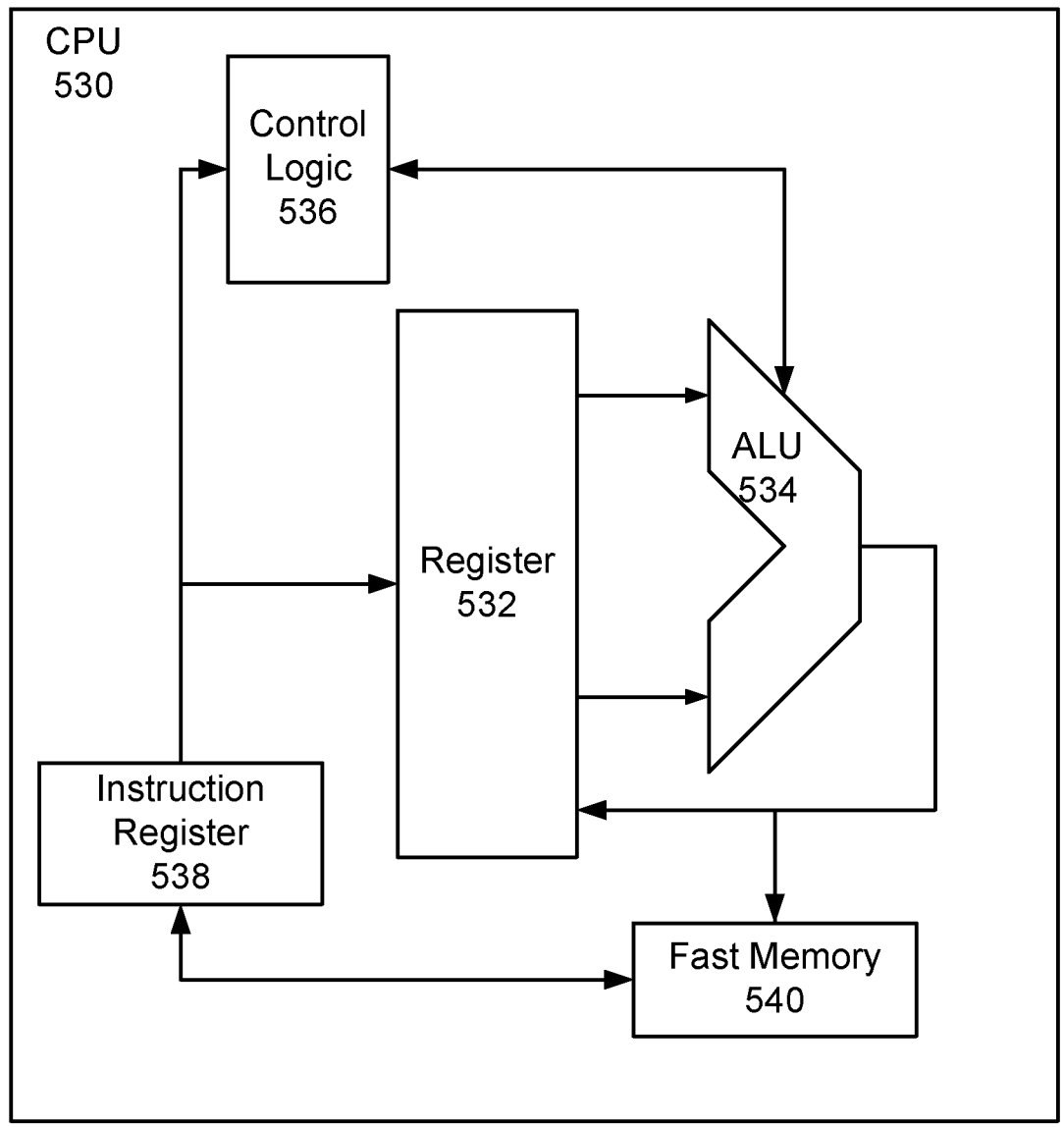
FIG. 5 illustrates architecture of the CPU illustrated in FIG. 4 according to one example.

For example, FIG. 5 shows one implementation of CPU 530. In one implementation, the instruction register 538 retrieves instructions from the fast memory 540. At least part of these instructions are fetched from the instruction register 538 by the control logic 536 and interpreted according to the instruction set architecture of the CPU 430. Part of the instructions can also be directed to the register 532. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 534 that loads values from the register 532 and performs logical and mathematical operations on the loaded values according to the instructions. The results from these operations can be feedback into the register and/or stored in the fast memory 540. According to certain implementations, the instruction set architecture of the CPU 430 can use a reduced instruction set architecture, a complex instruction set architecture, a vector processor architecture, a very large instruction word architecture. Furthermore, the CPU 430 can be based on the Von Neuman model or the Harvard model. The CPU 530 can be a digital signal processor, an FPGA, an ASIC, a PLA, a PLD, or a CPLD. Further, the CPU 430 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 4, the data processing system 400 can include that the SB/ICH 420 is coupled through a system bus to an I/O Bus, a read only memory (ROM) 456, universal serial bus (USB) port 464, a flash binary input/output system (BIOS) 468, and a graphics controller 458. PCI/PCIe devices can also be coupled to SB/ICH YYY through a PCI bus 462.

The PCI devices may include, for example, Ethernet adapters, add-in cards, and PC cards for notebook computers. The Hard disk drive 460 and CD-ROM 466 can use, for example, an integrated drive electronics (IDE) or serial advanced technology attachment (SATA) interface. In one implementation the I/O bus can include a super I/O (SIO) device.

Further, the hard disk drive (HDD) 460 and optical drive 466 can also be coupled to the SB/ICH 420 through a system bus. In one implementation, a keyboard 470, a mouse 472, a parallel port 478, and a serial port 476 can be connected to the system bust through the I/O bus. Other peripherals and devices that can be connected to the SB/ICH 420 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 6, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Figure 6:
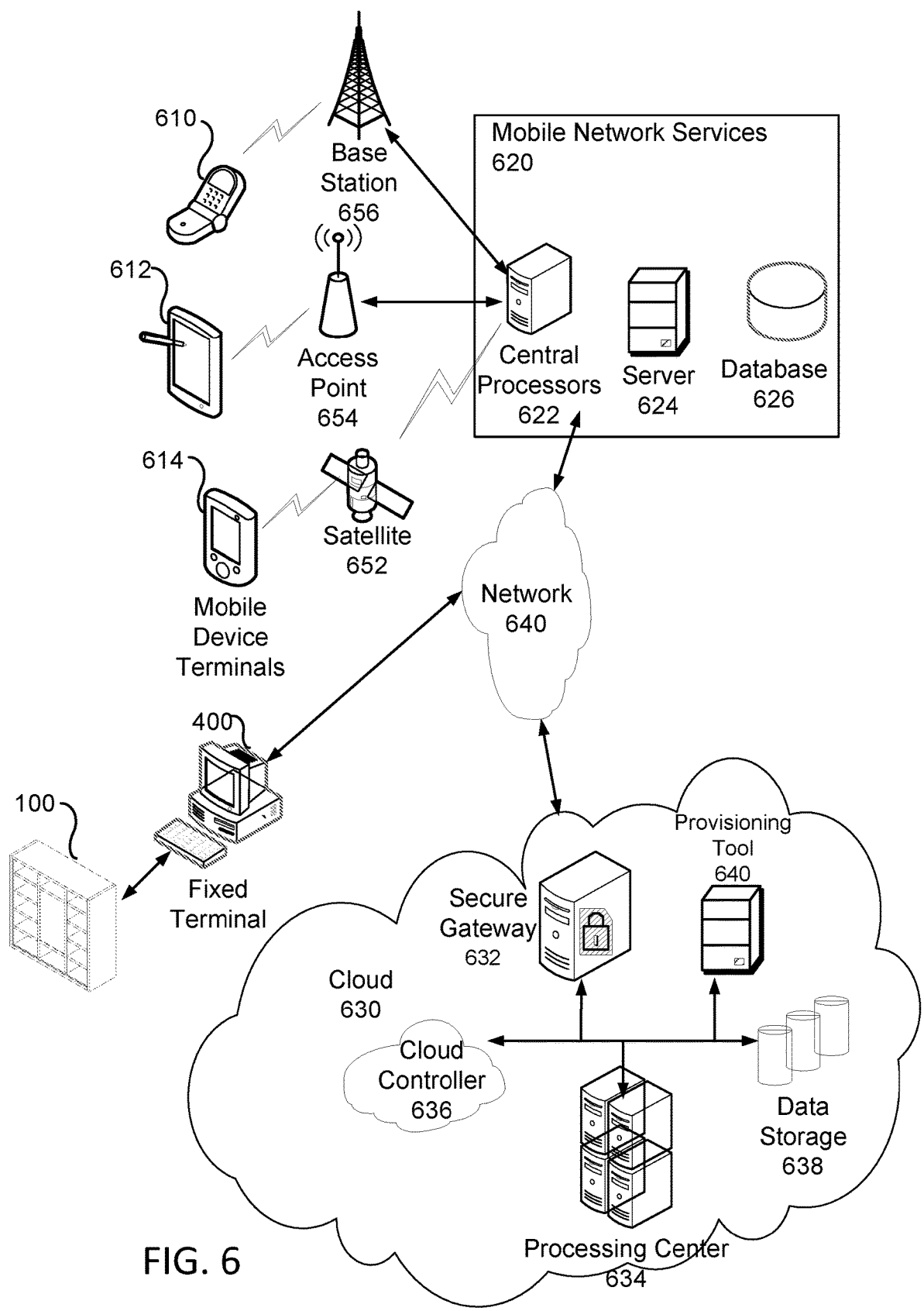
FIG. 6 illustrates various interconnected network elements used in conjunction with the invention according to one example.

FIG. 6 shows an example of cloud computing, having various devices interconnected to each other via a network and cloud infrastructures. For example, a smart phone 614 connecting to a mobile network service 620 through a satellite connection 652 can connect to the interactive display case 100 via the mobile network services 620 and the fixed terminal 616 connected to or included in the interactive display case 100. Similarly, FIG. 6 shows a PDS 612 and a cellular phone 614 connected to the mobile network service 620 through a wireless access point 654, such as a femto cell or Wi-Fi network. Further, FIG. 6 shows the data processing system 400 connected to the mobile network service 620 through a wireless channel using a base station 656, such as an Edge, 3G, 4G, or LTE Network, for example. Various other permutations of communications between the types of devices and the mobile network service 620 are also possible, as would be understood to one of ordinary skill in the art. The various types of devices, such as the cellular phone 614, tablet computer 616, or a desktop computer, can also access the network 640 and the cloud 630 through a fixed/wired connection, such as through a USB connection to a desktop or laptop computer or workstation that is connected to the network 640 via a network controller, such as an Intel Ethernet PRO network interface card from Intel Corporation of America, for interfacing with a network.

Signals from the wireless interfaces (e.g., the base station 656, the wireless access point 654, and the satellite connection 652) are transmitted to and from the mobile network service 620, such as an EnodeB and radio network controller, UMTS, or HSDPA/HSUPA. Requests from mobile users and their corresponding information as well as information being sent to users is transmitted to central processors 622 that are connected to servers 624 providing mobile network services, for example. Further, mobile network operators can provide services to the various types of devices. For example, these services can include authentication, authorization, and accounting based on home agent and subscribers' data stored in databases 626, for example. The subscribers' requests can be delivered to the cloud 630 through a network 640.

As can be appreciated, the network 640 can be a public network, such as the Internet, or a private network such as an LAN or WAN network, or any combination thereof and can also include PSTN or ISDN sub-networks. The network 640 can also be a wired network, such as an Ethernet network, or can be a wireless network such as a cellular network including EDGE, 3G and 4G wireless cellular systems. The wireless network can also be Wi-Fi, Bluetooth, or any other wireless form of a communication that is known.

The various types of devices can each connect via the network 640 to the cloud 630, receive inputs from the cloud 630 and transmit data to the cloud 630. In the cloud 630, a cloud controller 636 processes a request to provide users with corresponding cloud services. These cloud services are provided using concepts of utility computing, virtualization, and service-oriented architecture. For example, data from the system 400 such as statistical data with respect to user interactions with the interactive display case 100, 200, 300 can be sent via the network 640 to the cloud 630 for storage in data storage 638, processing by the data center 634 and later retrieval. Data from the cloud 630 can be accessed by the system 400 based on user interaction and pushed to user devices 610, 612, and 614.

The cloud 630 can be accessed via a user interface such as a secure gateway 632. The secure gateway 632 can, for example, provide security policy enforcement points placed between cloud service consumers and cloud service providers to interject enterprise security policies as the cloud-based resources are accessed. Further, the secure gateway 632 can consolidate multiple types of security policy enforcement, including, for example, authentication, single sign-on, authorization, security token mapping, encryption, tokenization, logging, alerting, and API control. The cloud 630 can provide, to users, computational resources using a system of virtualization, wherein processing and memory requirements can be dynamically allocated and dispersed among a combination of processors and memories such that the provisioning of computational resources is hidden from the users and making the provisioning appear seamless as though performed on a single machine. Thus, a virtual machine is created that dynamically allocates resources and is therefore more efficient at utilizing available resources. A system of virtualization using virtual machines creates an appearance of using a single seamless computer even though multiple computational resources and memories can be utilized according increases or decreases in demand. The virtual machines can be achieved using a provisioning tool 640 that prepares and equips the cloud-based resources such as a processing center 634 and data storage 638 to provide services to the users of the cloud 630. The processing center 634 can be a computer cluster, a data center, a main frame computer, or a server farm. The processing center 634 and data storage 638 can also be collocated.

Figure 7:
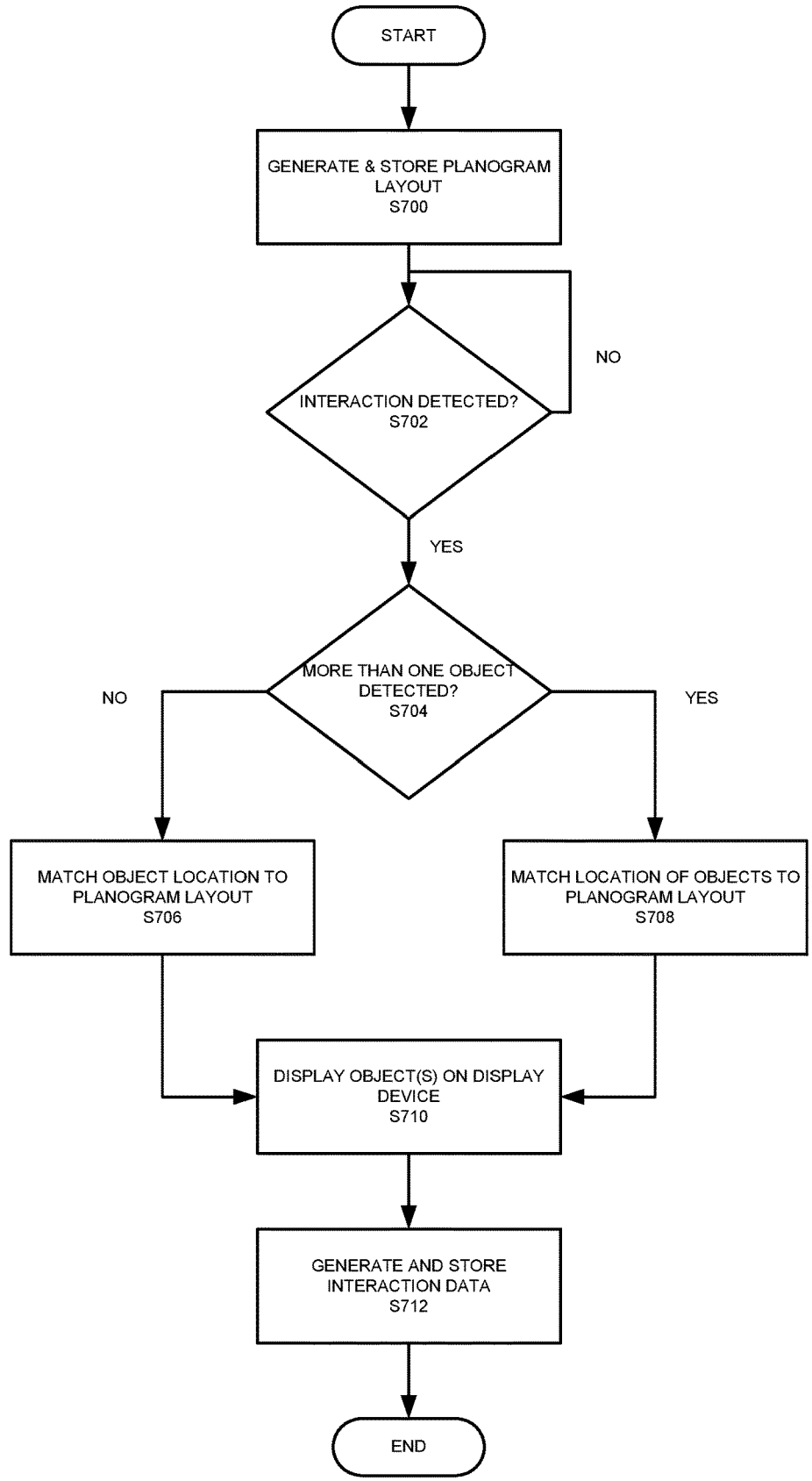
FIG. 7 illustrates a flow chart detailing functionality of the interactive display cases according to one example.

FIG. 7 illustrates a flow chart detailing functionality of the interactive display cases 100, 200, 300 according to one example. For simplicity sake, a description of FIG. 7 will be with respect to the interactive display case 100 but a similar description would apply for interactive display cases 200 and 300. At step S700, the processing circuitry or CPU 430 of the system 400 generates a planogram layout of products that will be stored or placed in the storage areas 112 of the interactive display case 100. This planogram maps products within the interactive display case 100 to various coordinates within the interior perimeter 116 of the sensing frame 109. These coordinates correspond to the various storage areas 112 of the frame 101. This planogram layout is then saved into the memory of the system 400 and/or cloud 630 for later retrieval and analysis by the system 400. The planogram layout can be generated/updated at the system 400 itself or remotely via network 640. Thus, updated planogram layouts may be received locally at the system 400 or remotely via cloud 630. The planogram could also be generated based on inputs received by the system 400 via the sensing frame 109. As such, a user could interact with each storage area 112 within the frame 101 for which products are stored and for each interaction the sensing frame 109 could detect corresponding coordinates. These coordinates by themselves or with a multiplier can then be used by the system 400 to generate the planogram layout of the frame 101 having the detected storage areas 112. Alternatively, a user could trace the perimeter of each storage area 112 by using their finger and having the system 400 identify this perimeter and update the planogram based on data from the sensing frame 109.

At step S702, the sensing frame 109 detects whether or not there is an interaction of an object with the sensing frame 109. In other words, the sensors of the sensing frame 109 determine whether or not an object has passed through an interior perimeter of the sensing frame 109. If no interaction is detected at step S702, the system 400 will take no action other than to continue to poll for future interactions. If an interaction is detected at step S702, the process proceeds to step S704 to determine if more than one object is detected for the interaction.

If only one object is detected (i.e. the sensors of the sensing frame 109 only detect the interruption of the LEDs at one location within the inner perimeter 109), the system 400 proceeds to step S706 to match the location at which the object was detected to the planogram layout. In this case, at step S708, the system 400 analyzes the coordinates of the detected object within the inner perimeter 116 based on the sensor readings and maps this location to the planogram layout to identify which product a user may be interested in within a specific storage area 112. It is possible that the coordinates of the detected object can overlap with more than one storage area 112. In this case, the system 400 can identify which storage area 112 the user intended based on one or more factors. The factors can include a determination of which area contains the largest portion of the object passing through the interior of the sensing frame 109, 209, 309. Other factors can include past interactions of the user stored on the cloud 630 or within a predetermined period of time of interaction as well as information as to whether the storage area 112 contains a product or not. Using one or more of these factors, the processing circuitry identifies a single storage area 112 corresponding to the object interaction. Alternatively, the system 400 may detect multiple storage areas 112 for further processing. Also, at this time, the system 400 records the time of interaction along with the identified storage area(s) 112 and product(s) corresponding to the storage area(s) 112.

Once the system 400 identifies this information and based on the number of storage areas 112 identified, the system 400 can cause the display device 114 to display the product on the display device 114 which represents the location of the interaction within the inner perimeter 116 of the sensing frame 109 and corresponds to the planogram coordinate mapping of the storage areas 112 stored in memory. Thus, at step S710, the system 400 causes the display device 114 to display product information relating to the product the user was interested in via pointing to the product through the sensing frame 109 or actually interacting with the product by passing their hand or another object through the sensing frame 109. If the product is no longer available in the storage area 112 as noted by the system 400 via an updated planogram mapping and/or a weighting sensor located in the storage area, the system 400 may provide information to the user about products relating to a product that was previously displayed in the particular storage area 112 of interest. Further, if the interaction is very brief and less than a predetermined period of time as detected by the sensors 109, the system 400 can determine not to display any information on the display device 114 with respect to the detected location and planogram-mapped storage area 112.

It is worth noting that the planogram layout can map products to the plurality of storage areas 112 and that this mapping is based on coordinates within the frame 101 of the interactive display case 100. Thus, in the case where the display case 100, 200, 300 has products hanging on pegs and/or singular shelves within the frame such as in FIG. 1C, the planogram layout can map those areas the same as previously discussed herein to a particular set of coordinates or area within the sensing frame 109. In other words, the storage area 112 can be an area in which a product is hanging from a peg or hook such that the storage area 112 represents the area within the frame 101 in which a plurality of coordinates of that area are mapped to the planogram to represent the location of one or more products. Further, the planogram can be updated in real-time based on interactions with the display case 100. For example, products detected as being taken out of the frame 101 can be used to generate inventory data. Further, products being placed back into the frame can be identified to generate the data described below or to identify if they are placed in a different spot. This could be done by using RFID tags on the clothing to track these exchanges and/or using weight sensors within the frame 101 in conjunction with the system 400.

At step S712, the system 400 generates data and time information of the interaction and records the date and time of the interaction in memory of the system 400 and/or memory in the cloud 630. For example, the amount of interactions with particular storage areas 112 and thus particular products can be saved to memory to provide statistical data to retailers. Data with respect to how long the interaction took place can also be saved to provide information as to customer interest levels. Further, information about products that are interacted with and sensed by the sensing frame 109 can cause the system 400 to provide the customer with information relating to these products in addition to visual information via the display device 114. For example, the system 400 can push this information to user devices 610, 612, 614 via the network 640 and mobile network services 620. Alternatively, the user may interact with the display device 114 via touch, voice or any other method to seek information about the product or related products. Examples of such data are included in FIGS. 12 and 13. The data can also include interactions with the display device 114. All of this data can be saved locally at the system 400 or transmitted by the system 400 to the cloud 630 via network 640 for remote storage at data storage 638 and analysis by processing center 634.

Further, it should be noted here that if the interactive display case 100, 200, 300 does not include a display device 114, 214, 314, the above-noted processing is the same except that step S710 is omitted. Also, it should be noted that Steps S710 and S712 can be reversed such that interaction data can be generated and stored before anything is displayed on the display device.

Referring back to step S704, if more than one object is detected passing through the sensing frame 109, the system similarly proceeds at step S708 to map the detected coordinates of the interaction within the inner perimeter 116 of the sensing frame 109 to the mapped planogram to identify a plurality of products that the user may be interested in which are located in correspondingly located storage areas 112. The system 400 then at step S710 causes at least one of these objects to be displayed on the display device 114. In one example, the system 400 may cause both products to be display on the display device 114. However, this can vary based on a variety of factors. For example, the system 400 may identify that one interaction with the frame 101 only lasted for a minimum predetermined period of time such that the system 400 will ignore this interaction. Alternatively, the system 400 may know that the product in a particular storage area 112 is no longer there based on an updated planogram mapping and/or a weighting sensor built into the storage areas 112. In this instance, the system 400 would not cause this particular object to be displayed. Further, the system 400 may display both products but display one with more prominence based on historical information with respect to a specific user. This information can be stored on the system 400 or cloud 630 based on previous interactions by the user. The user can be identified by the system 400 polling user devices 610, 612 and 614 via the network 630 and mobile network services 620.

Figure 8:
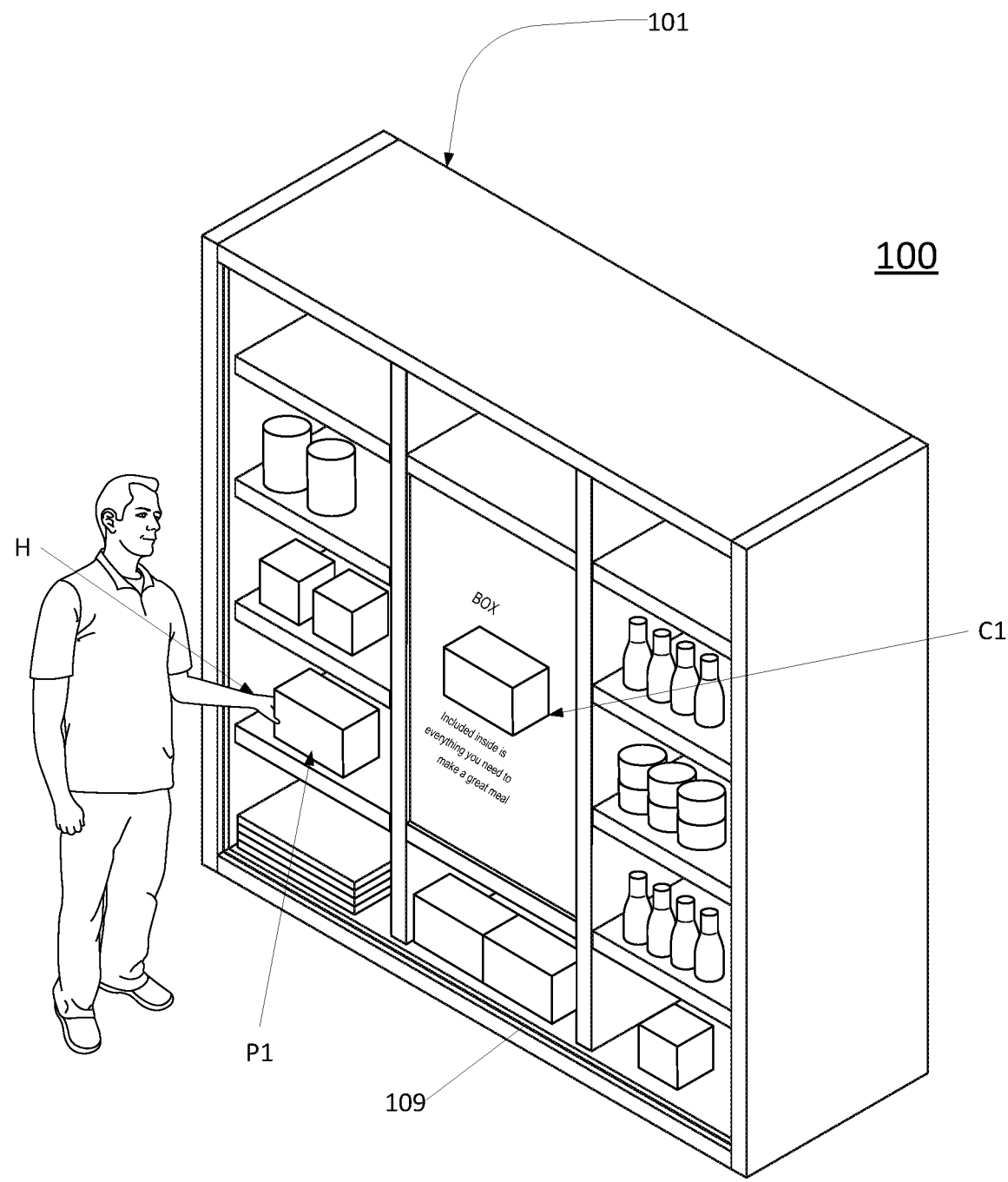
FIG. 8 illustrates a user interaction with the interactive display case according to one example.

FIG. 8 provides an example of an interaction of a user with the interactive display case 100 according to one example. In this example, the user has passed his hand H within the inner perimeter 116 of the sensing frame 109 to touch a product P1. The sensors of the sensing frame 109 detect this interaction and provide the system 400 with coordinates of the interaction. The system 400 processes these coordinates and maps them to a corresponding storage area 112 based on the planogram mapping. Based on this interaction, the system 400 then causes the display device to change the current display to display content C1 related to the product P1. In this case, the user interacted with a box having information related to a particular meal. Therefore, the user merely by having an interaction with the box can discover additional information about the product via the display device 114. For instance, the display device 114 can identify the price, contents and other advertising material with respect to the produce P1. The display device 114 could also show the interior materials within the box thereby preventing the user from having to open the box and providing retailers and distributors with enhanced product security and durability. If the user then moved his hand H to another storage area 112 and passed his hand H through the interior perimeter 116 of the sensing frame 109, the system 400 would then process the detected coordinates, map them to the mapped planogram and cause the display device to display different information with respect to the newly selected product.

Further, if a second object is detected by the sensing frame 109 while a first content is being displayed on the display device 114 the system 400 can control the display device 114 to continue showing the first content and queue the content related to the second product; stop showing the first content and show only the content related to the second product; continue showing the first content and show the second content in split screen or a separate window; and/or depending on which product is touched, the system 400 can disregard detection of the second object and not cause any additional content to be displayed. The owner can specify any of these actions using the planogram layout software discussed further below.

Additionally, the interactive display case 100 can include a sensor (not shown) configured to detect when a consumer is present in the area in front of the interactive display case 100, 200, 300. If the sensor detects that a consumer is no longer in front of the interactive display case 100, 200, 300, the processing circuitry can control the display device 114, 214, 314 to return to a stand-by screen. Further, by including a sensor configured to detect when a consumer is present in the area in front of the interactive display case 100, 200, 300, accidental product touching caused by wind, shopping carts, or other objects can be detected and will not cause product content to be displayed on the display device 114, 214, 314. For example, if no consumer is present in front of the display device 114, 214, 314 and stray shopping cart bumps into a product on the interactive display case 100, 200, 300, the processing circuitry will ignore the sensor's object detection and not display product content.

FIG. 9 shows one interface to planogram software according to one example. The software may be executed by the system 400 and provide the user with an interface with respect to planogram generation. This screen shows access to a list of all the designs 45 that have been uploaded by a client currently logged in. The user may upload a new planogram to the system or may perform other actions 46 on the uploaded planogram, such as deleting a planogram or viewing its analytics and/or redesigning the layout of the planogram with respect to different interactive display cases.

FIG. 10 shows another interface to the planogram software according to one example. The screen shows data associated with a given planogram and allows the user to edit it. Specifically, it shows the planogram name 52, the name of the layout file 53 and the name of style file 54. It also allows the user to edit any number of parameters or fields 55 in the given planogram layout. Once changes are made, the user may save 50 or duplicate 51 the planogram layout. This information can then be displayed on the display device 114 when a user interacts with a storage area 114 having the product related to the specific parameters.

FIG. 11 shows a third interface to the planogram layout software according to one example. This screen allows the logged-in user to see all the in-store display units by store location 63. It also enables the user to create a new store location 60 and to perform actions upon that store display 61. One major feature of this screen is that it allows the user to assign a given planogram layout 64 to a specific store. The user may also group stores together and then assign the group a given planogram layout all at once. Once this assignment is made, the in-store display will automatically download and switch over to the new planogram layout.

FIG. 12 shows a fourth interface to the planogram layout software according to one example. This screen displays the monitoring system. It allows a logged-in user to view all data associated with a given interactive display case. In particular, one may access the analytics 71 for an interactive display case. The user may also assign the planogram layout for the interactive display case 72. The screen also shows the current state of the interactive display case, including the state of the software and the timing of various system events. The screen also allows the user to see live video 74 from a sensor in the display device so they can view the current state of the interactive display case. The user may also save 70 any changes they make to the display settings on this screen. The above-noted information may be stored on the system 400 or can be accessed on the cloud 630 via the network 640.

Figure 13:
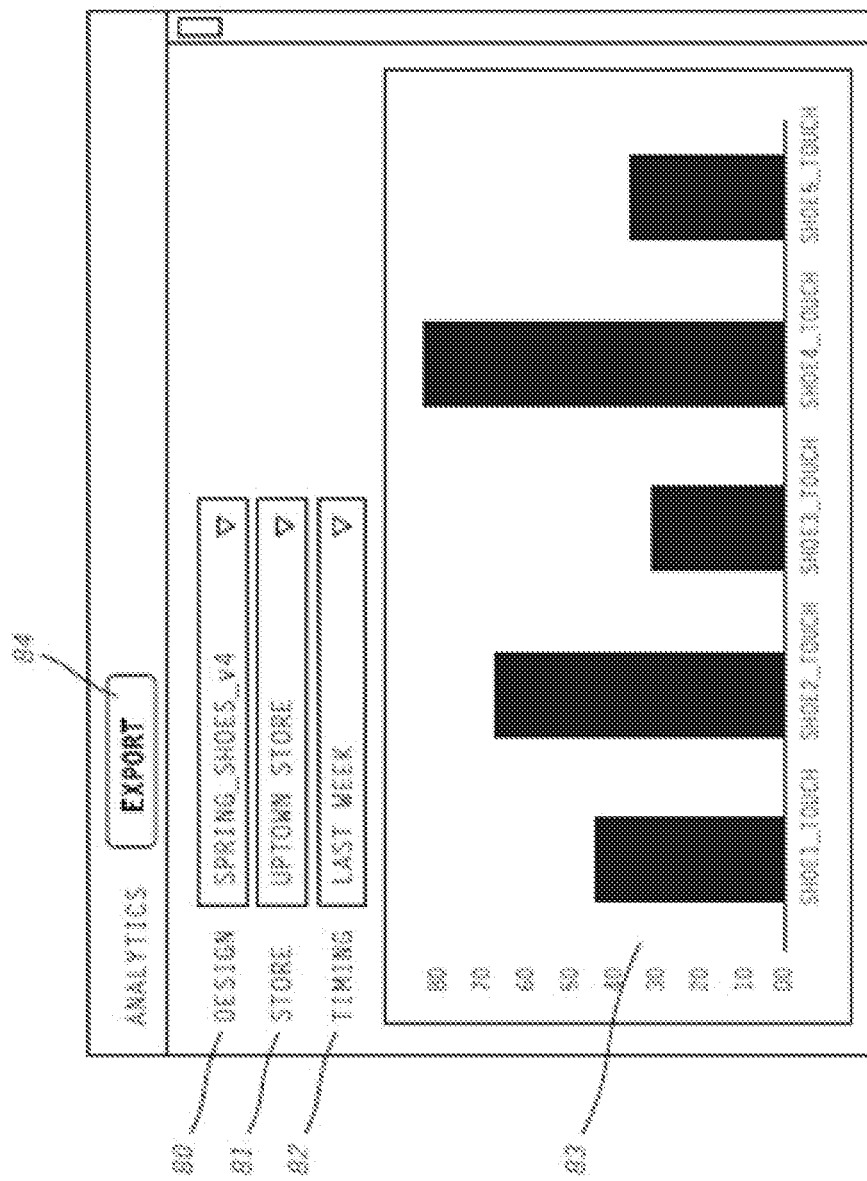
FIG. 13 illustrates a screen of a user interface associated with software used in conjunction with the invention showing data analytics collected by the invention according to one example.

FIG. 13 shows a fifth interface to the planogram layout software according to one example. This screen displays the analytics data associated with a given interactive display case. The user may select a planogram layout 80 and then choose a store 81 where that planogram layout is active. They may also choose to view the results of a given planogram layout across multiple stores. The user may set the timing 82 for the duration of analytics data that they would like to view. Upon making the choices above, the logged-in user will be presented with a graph 83 or other visualizations showing analytics data, including data about how often a given product is touched and how often a given button is touched. The user may also export 84 this data for viewing in and processing by another software application.

Figure 14:
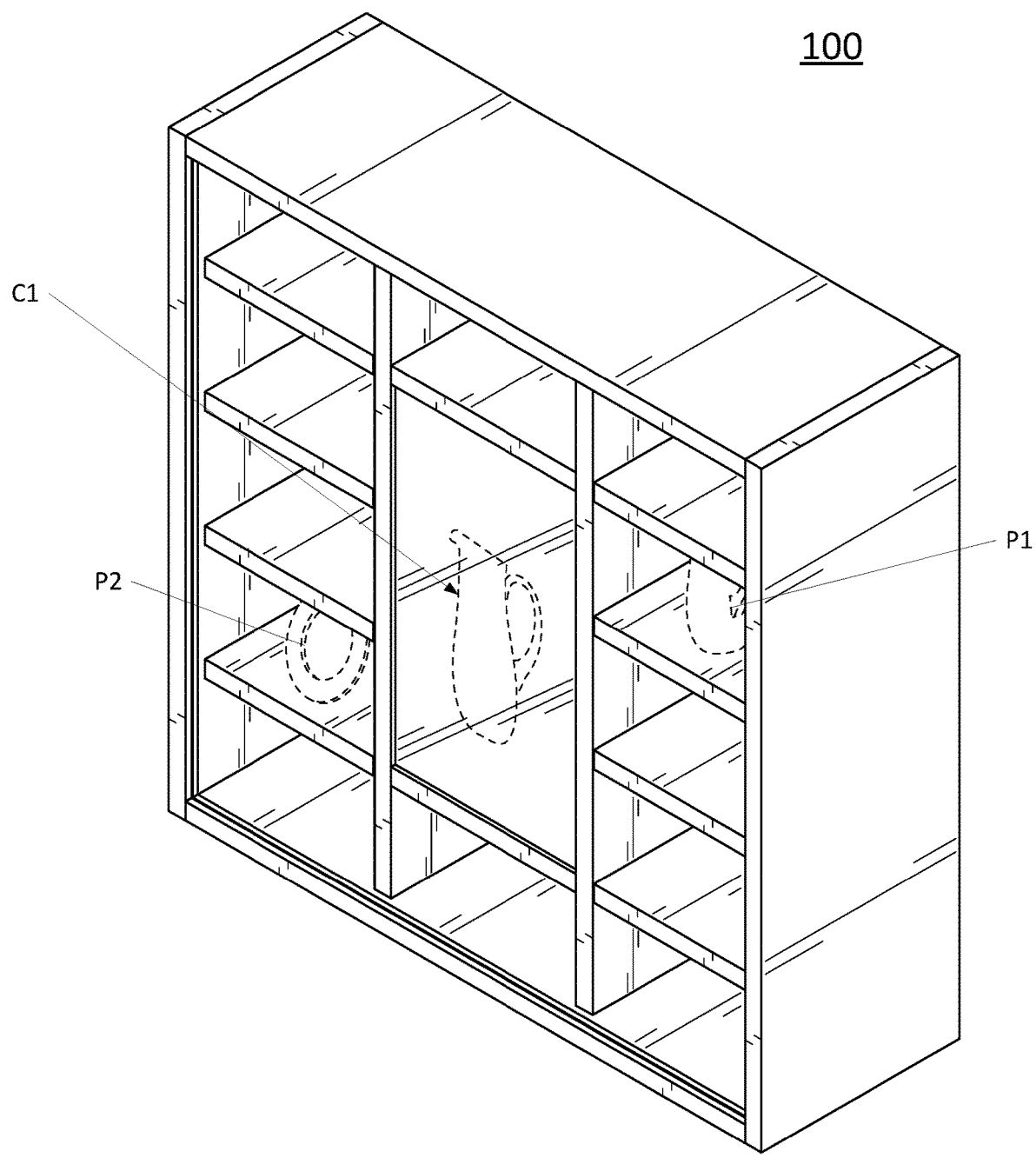
FIGS. 14-20 illustrate further exemplary views of the first interactive display case.
Figure 15:
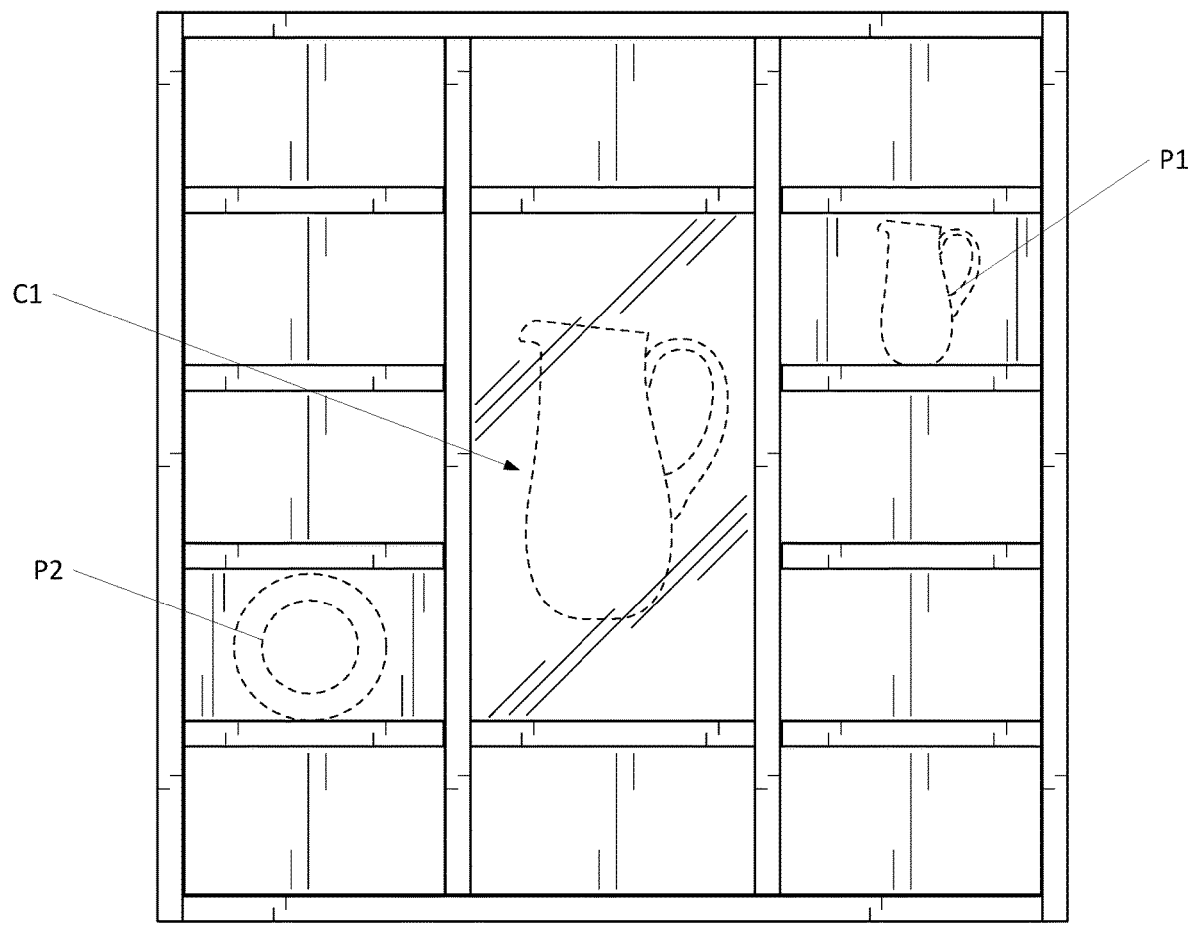
Figure 21:
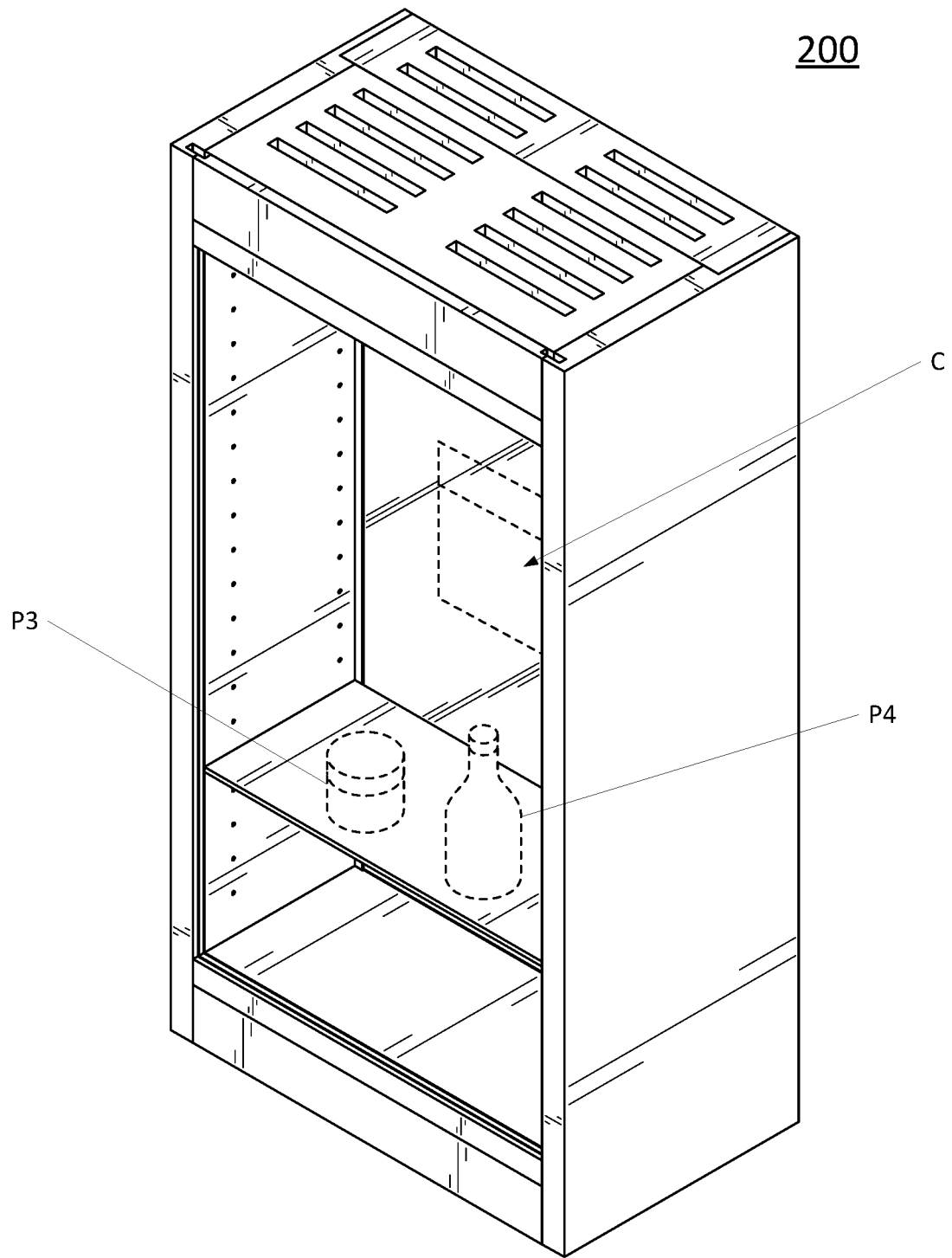
FIGS. 21-27 illustrate further exemplary views of the second interactive display case.
Figure 22:
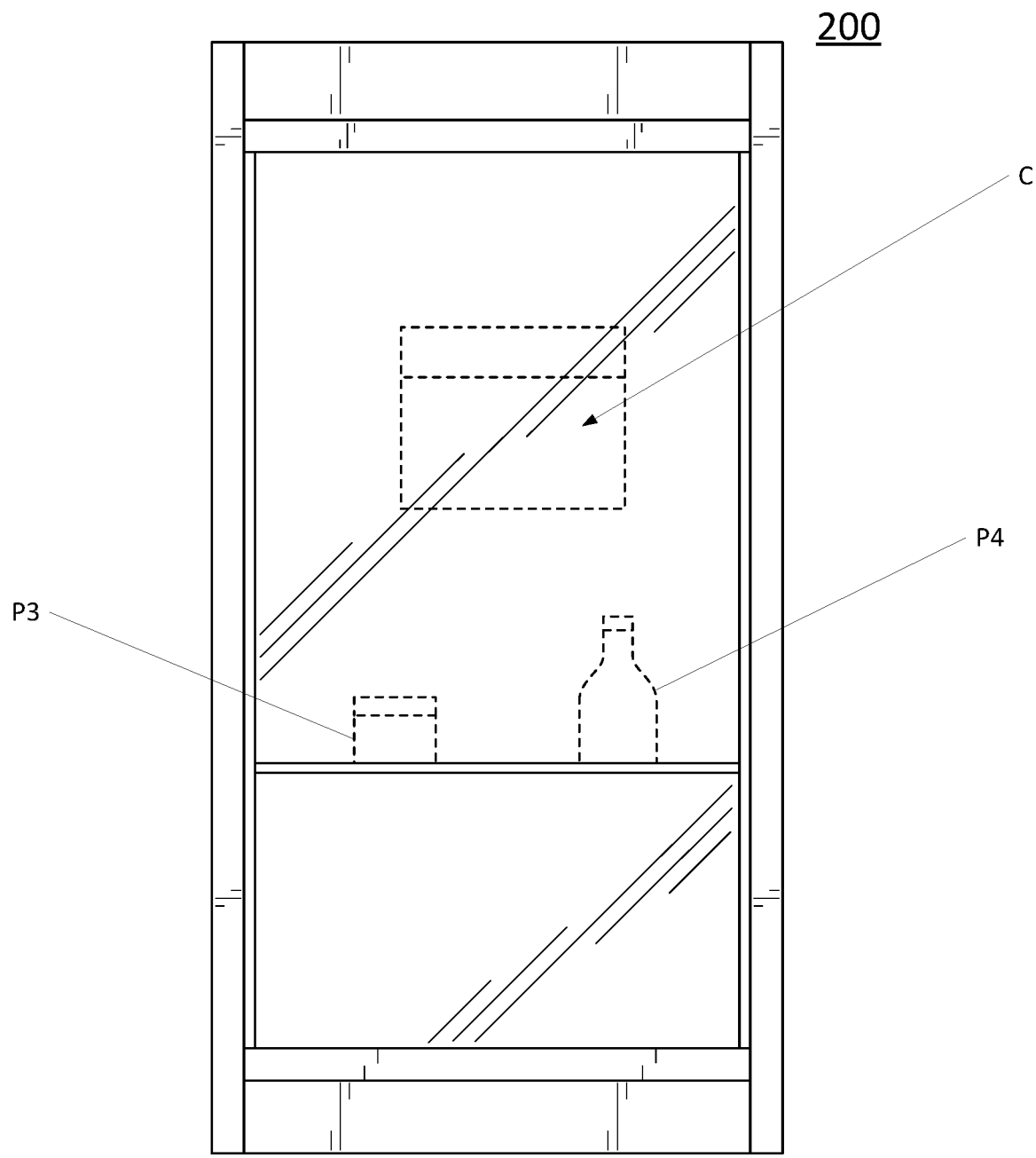
Figure 23:
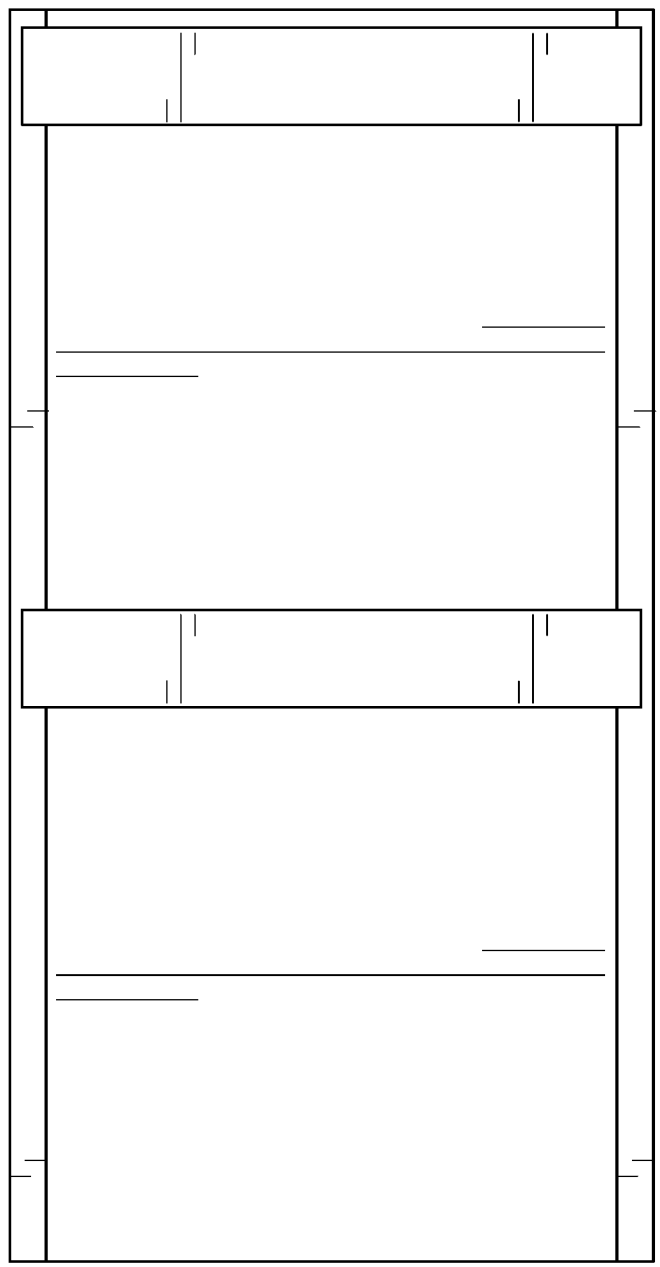
Figure 24:
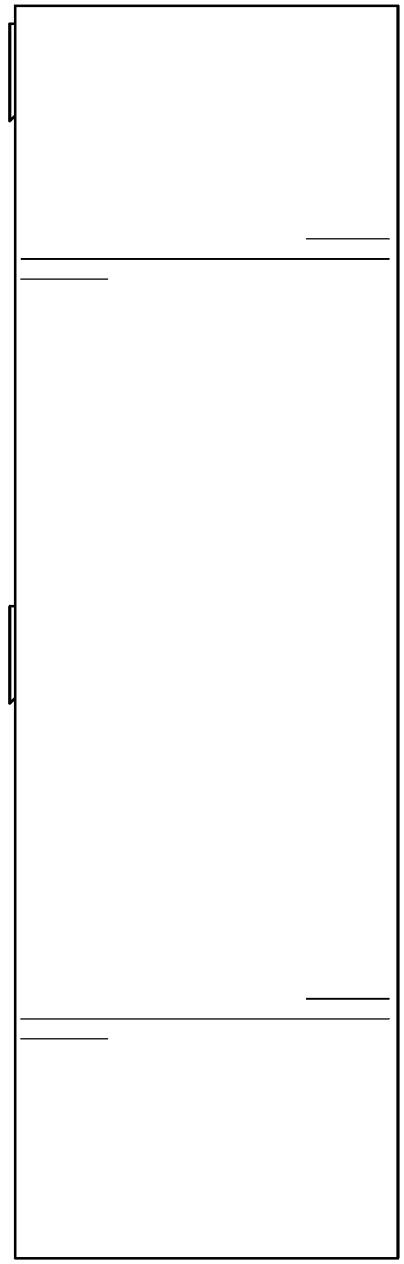
Figure 25:
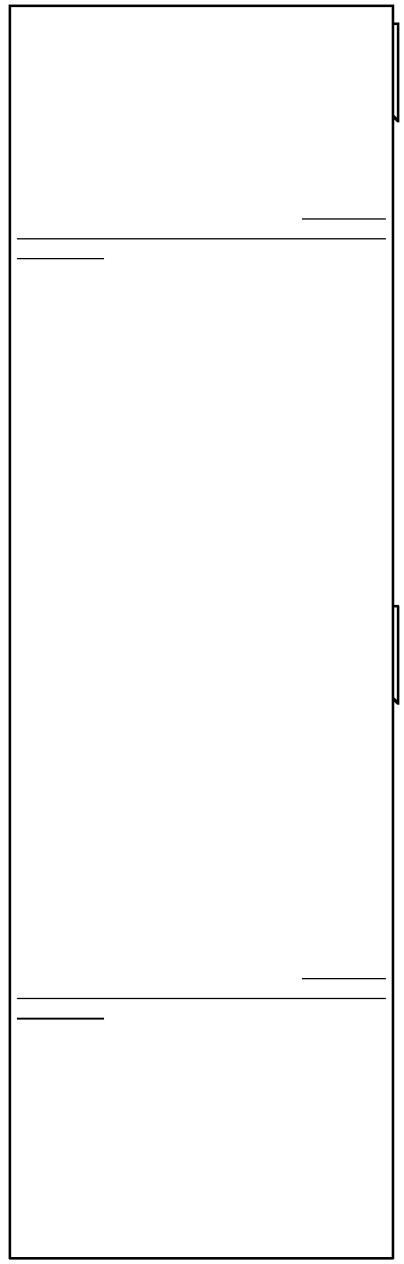
Figure 26:
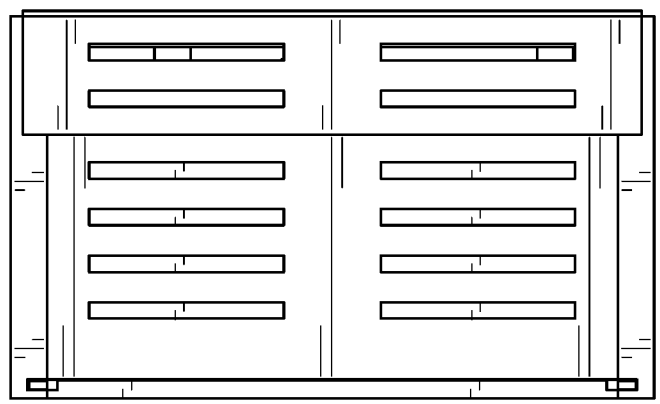
Figure 27:
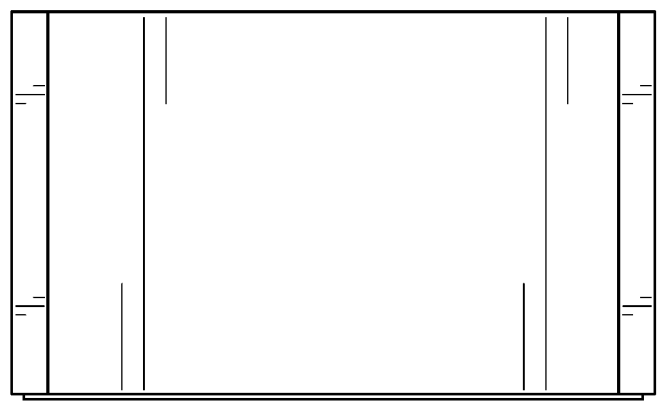
Figure 28:
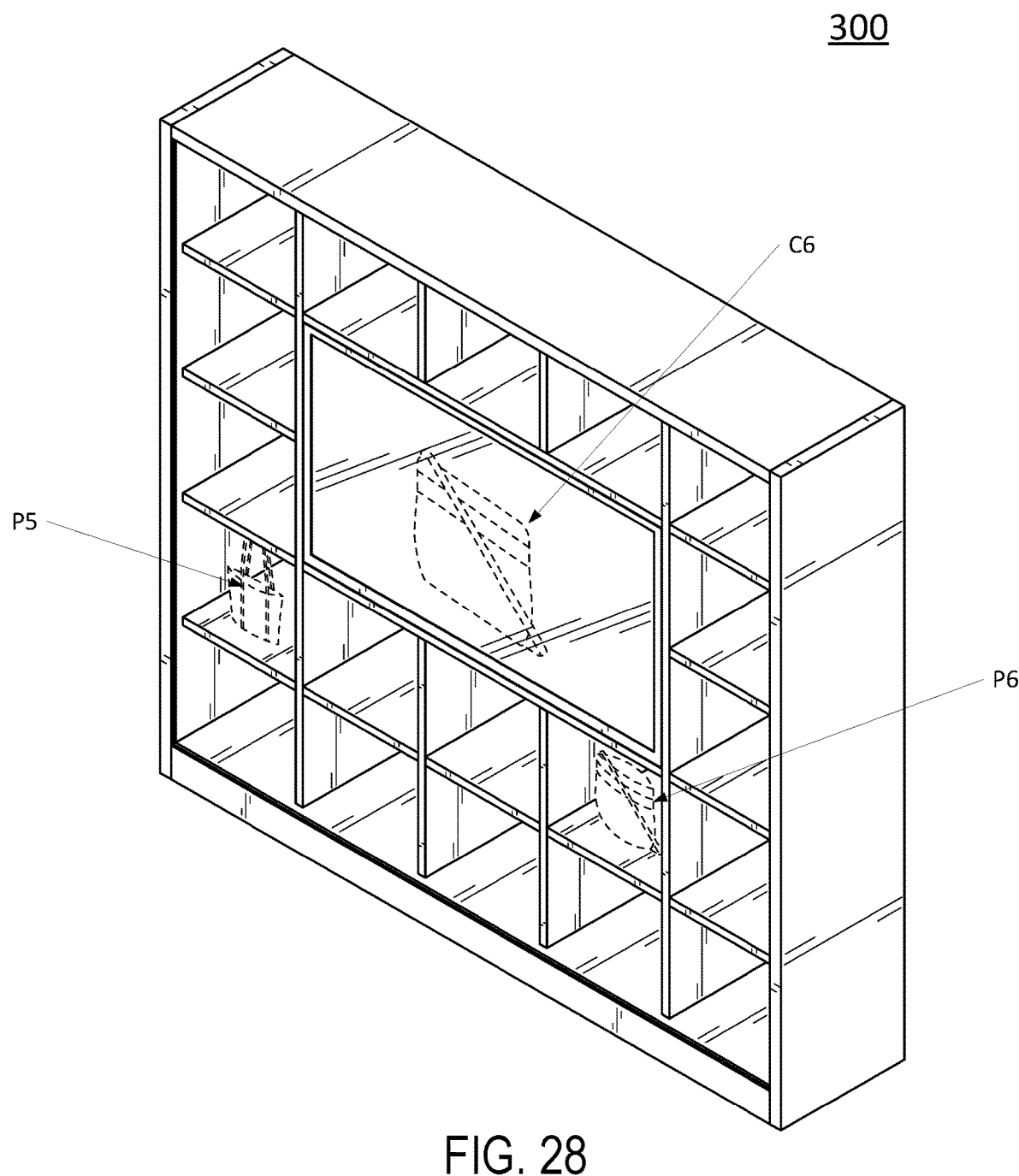
FIGS. 28-34 illustrate further exemplary views of the third interactive display case according to one example.
Figure 29:
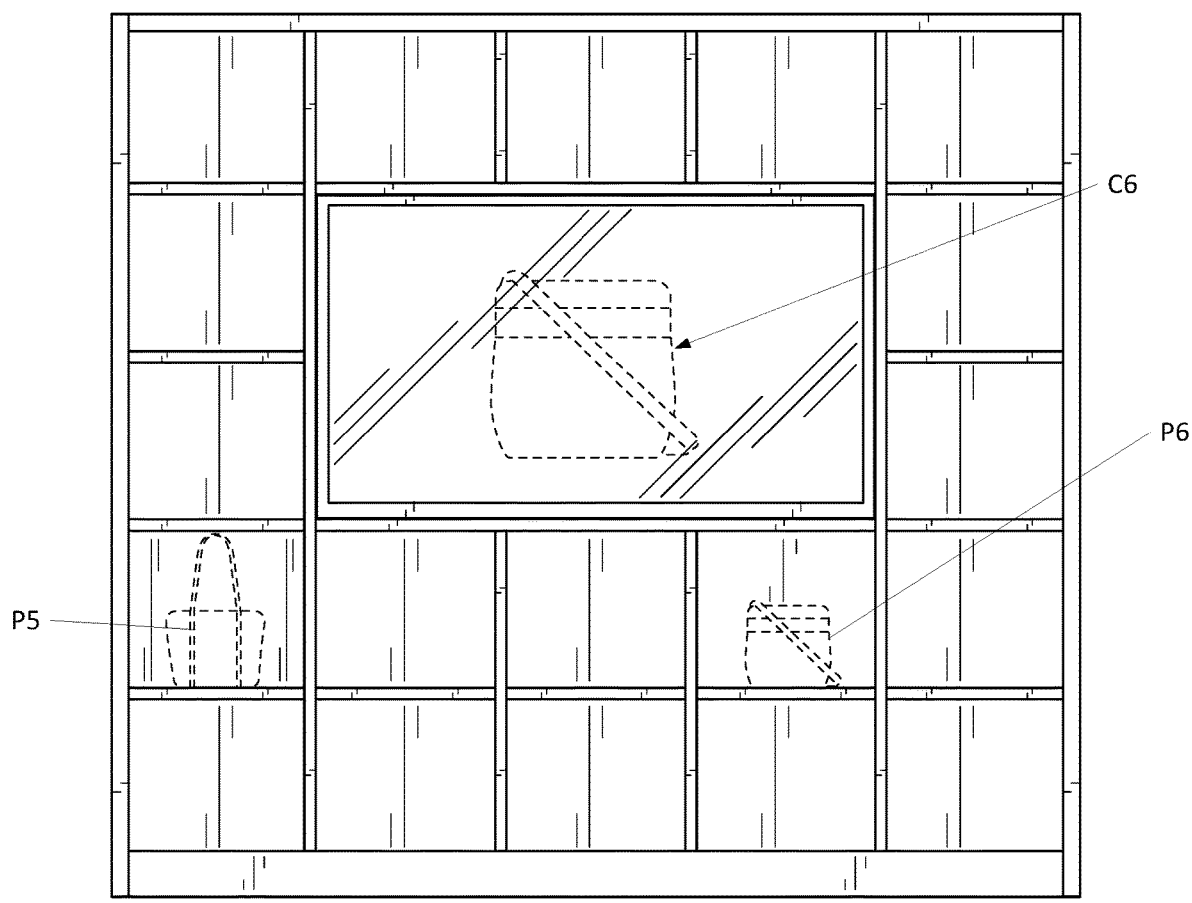
Figure 30:
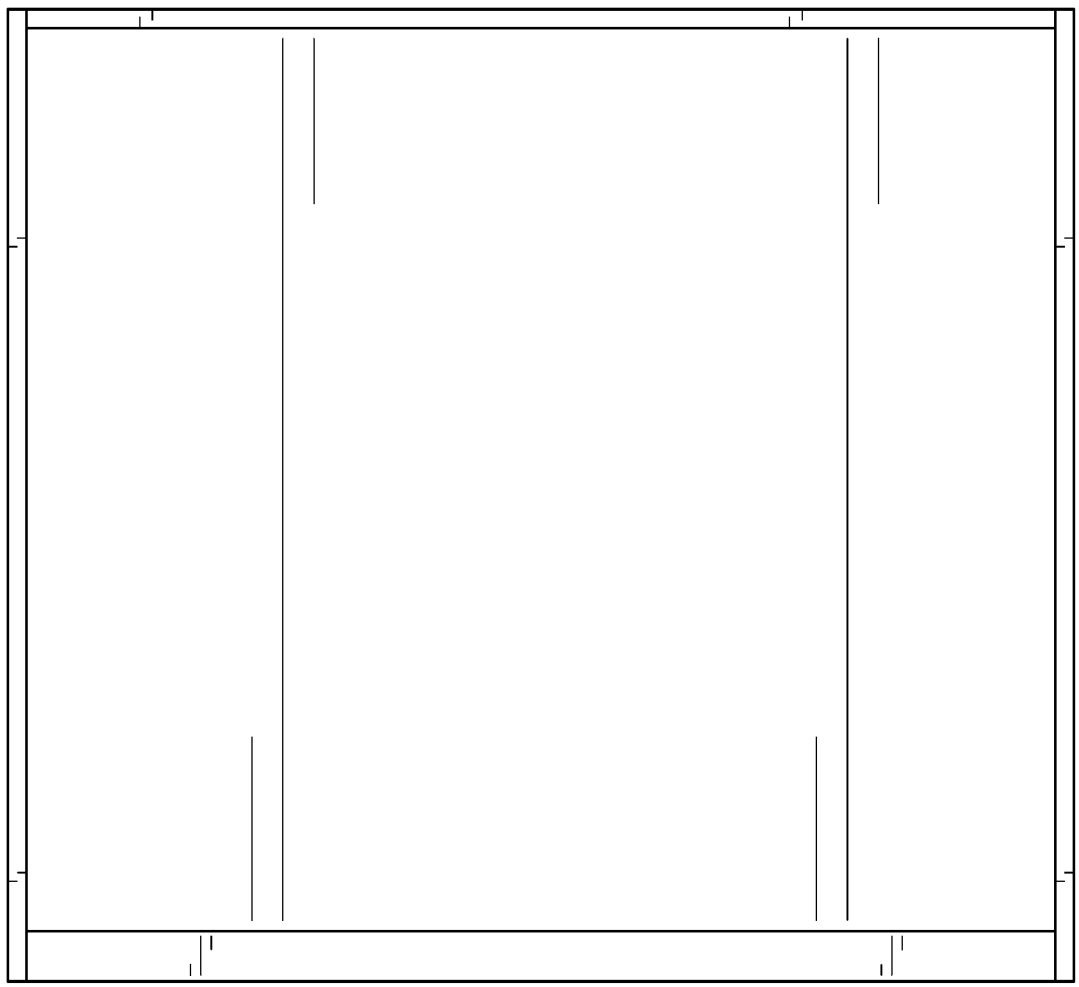
Figure 31:
Figure 32:
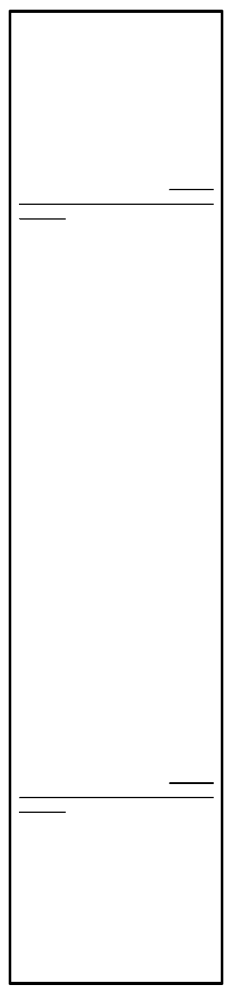
Figure 33:
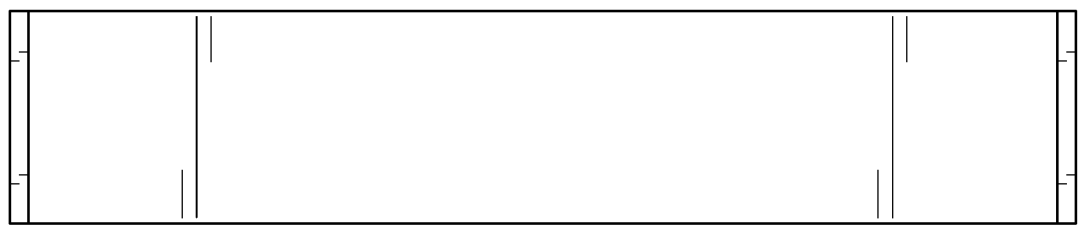
Figure 34:

FIGS. 14-34 illustrate the interactive display cases 100, 200, 300 with products P1, P2, P3, etc. and content C1, C2, C3, etc. related to the products displayed on the display devices 114, 214, 314. For example, FIGS. 14 and 15 illustrate the interactive display case 100 in which two products P1 and P2 are located in storage areas 112 but product P1 has been interacted with and is thus displayed as content C1 on display device 114. This is similar to FIGS. 21 and 22 showing products P3 and P4 but product P3 being displayed as content C on display device 214 based on product interaction with product P3. FIGS. 28 and 29 similarly illustrate products P5 and P6 with the display device 314 displaying product P6 as content C6 based on interaction with product P6. FIGS. 14-34 also illustrate various views of each interactive display case from the front, back, bottom, top and sides all of which have been described herein and thus further description is omitted.

The combination of features described above provides a more advanced interactive display case which is not inhibited by requiring image-capture sensors, a clear line of sight to the products, or any other deficiency in the prior art. Further, the interactive display cases having the sensing frame provide an integrated unit that is cheaper to manufacture, easier to assemble and takes less retail space. This makes it cheaper for owners to implement the interactive display case in stores while also making it easier for retailers to accept the setup. Further, the sleek look and design of the interactive display cases naturally attracts customers who want to interact with the display case and learn more about potential product. This leads to additional sales and brand recognition. Further, the statistical data affords companies and retailers with highly coveted user data so that future products, planogram layouts and product distribution can be specifically targeted to increase sales. This data was not easily obtainable in the past as it was difficult to capture in-store interactions with products. Receipt data may provide some insight as to likes and dislikes but this does not fully capture all shopping information based on what products users may have interacted with but not purchased. This additional data can be combined with purchase data to generate useful metrics and target data for consumers.

Obviously, numerous modifications and variations of the present invention are possible in light of the above teachings. It is therefore to be understood that within the scope of the appended claims, the invention may be practiced otherwise than as specifically described herein.

Exemplary implementations include:

A. A display case comprising:

a first frame;

a plurality of storage areas within the first frame;

a second frame; and processing circuitry configured to
detect an object passing through the interior of the second frame,
identify an area within the interior of the second frame in which the object passes, the area corresponding to one of the storage areas, and
generate interaction data corresponding to the identified area.

B. The display case of Claim A, wherein the frame further includes:
a top panel,
a bottom panel opposed to the top panel,
a first side panel secured to the top panel and bottom panel,
a second side panel, opposed to the first side panel, and secured to the top panel and bottom panel,
at least one horizontal panel, and
at least one vertical panel,
wherein the top panel, bottom panel, side panels, at least one horizontal panel, and at least one vertical panel combine to form the plurality of storage areas therebetween.

C. The display case of Claim A, wherein at least one of the plurality of storage areas extend along a width of the frame.

D. The display case of Claim A, wherein
the second frame includes sensors configured to detect an interaction within the interior of the second frame, and
the processing circuitry detects the object passing through the interior of the second frame and identifies the area based on data from the sensors.

E. The display case of Claim A, further comprising:
memory configured to store layout information corresponding to the plurality of storage areas,
wherein the processing circuitry generates the interaction data as a function of layout information corresponding to the identified area.

F. The display case of Claim E, further comprising:
an interface,
wherein the processing circuitry receives updated layout information via the interface.

G. The interactive display case of Claim F, wherein the interface is a network interface.

H. The display case of Claim A, wherein the processing circuitry is further configured to transmit the interaction data to an external device.

I. The display case of Claim A, wherein the processing circuitry is further configured to transmit the interaction data to an external device.

J. The interactive display case of Claim A, further comprising:
a display device affixed to the first frame,
wherein the processing circuitry controls the display device in response to the detection of the object passing through the interior of the second frame.

K. The display case of Claim J, further comprising:
memory configured to store layout information corresponding to the plurality of storage areas,
wherein the processing circuitry is further configured to control the display device to display content based on layout information corresponding to the identified area.

L. The display case of Claim J, wherein the display device is located at a rear side of the frame such that content displayed on the display device is viewed through at least one of the storage areas.

M. The display case of Claim E, wherein the layout information includes information identifying at least one of the dimensions of each storage area, an object stored within each storage area, and object data of each product.

N. The display case of Claim A, wherein a size of the inner perimeter of the second frame is the same size as the inner perimeter of the first frame.

O. The display case of Claim A, wherein the second frame is affixed to the first frame.

P. The display case of Claim A, further comprising:
memory,
wherein the processing circuitry is configured to store the interaction data in the memory each time an object is detected as passing through the interior of the second frame.

Q. The display case of claim O, wherein the processing circuitry only stores the interaction data if the detected object passing through the interior of the second frame is detected for a predetermined period of time.

R. A method comprising:
detecting, via processing circuitry, an object passing through the interior of a first frame of an interactive display case,
identifying, via the processing circuitry, an area within the interior of the first frame in which the object passes, the area corresponding to one of a plurality of storage areas within a second frame of the interactive display case, and
generating, via the processing circuitry, interaction data corresponding to the identified area.

S. A non-transitory computer-readable medium having stored thereon computer-readable instructions which when executed by a computer cause the computer to perform a method comprising:
detecting an object passing through the interior of a first frame of an interactive display case,
identifying an area within the interior of the first frame in which the object passes, the area corresponding to one of a plurality of storage areas within a second frame of the interactive display case, and
generating interaction data corresponding to the identified area.

The invention claimed is:
1. A display case comprising:
a display device;
a first frame;
a plurality of storage areas within the first frame, each storage area being formed from a plurality of panels;
a second frame affixed within the first frame and enclosing an interior perimeter of the first frame, the second frame having one or more sensors thereon configured to detect when one or more objects pass through the second frame; and
processing circuitry configured to
identify, based on data from the one or more sensors and in response to one or more objects passing through the second frame, at least two areas within the interior of the second frame in which the one or more respective objects pass, the at least two areas corresponding to one or more of the storage areas, and
control the display device to display content based on one or more of the identified at least two areas.

2. The display case of claim 1, wherein the first frame further includes:
a top panel,
a bottom panel opposed to the top panel,
a first side panel secured to the top panel and bottom panel,
a second side panel, opposed to the first side panel, and secured to the top panel and bottom panel, at least one horizontal panel, and
at least one vertical panel,
wherein the top panel, bottom panel, side panels, at least one horizontal panel, and at least one vertical panel combine to form the plurality of storage areas therebetween.

3. The display case of claim 1, wherein a size of a perimeter of the second frame is at least the size of a perimeter of the first frame, the first frame having a perimeter equal to a perimeter of the display case.

4. The display case according to claim 1, wherein the second frame is positioned behind an outermost perimeter portion of the first frame.

5. The display case according to claim 4, wherein the length and height of the first frame are the same as the length and height of the second frame.

6. The display case of claim 1, wherein the processing circuitry
determines an amount of time in which the one or more objects is detected by the one or more sensors, and
prevents the display device from displaying updated content corresponding to one or more of the identified at least two areas when the amount of time is less than a predetermined amount of time.

7. The display case according to claim 1, wherein the processing circuitry controls the display device to display internal contents of a packaged product corresponding to the one or more storage areas.

8. The display case according to claim 1, wherein when the processing circuitry identifies at least two areas within the interior of the second frame in which one object passes, the processing circuitry identifies one area based on an area in which the largest portion of the object passes.

9. The display case according to claim 1, wherein when the one or more sensors simultaneously detect at least two objects within the second frame, the processing circuitry controls the display device to display content based on one or more properties specific to each object.

10. The display case of claim 9, wherein the one or more properties include at least one of an amount of time in which an object of the one or more objects is detected by the second frame, stored historical information with respect to an object of the one or more objects, and occupancy of the area in which an object of the one or more objects passes.

11. The display case of claim 1, further comprising:
memory configured to store layout information corresponding to the plurality of storage areas,
wherein the processing circuitry stores interaction data corresponding to the identified at least two areas as a function of layout information corresponding to the at least two identified areas.

12. The display case of claim 11, wherein the processing circuitry updates the layout information as a function of the identified at least two areas.

13. The display case of claim 1, further comprising:
memory configured to store layout information corresponding to the plurality of storage areas,
wherein the processing circuitry is further configured to control the display device to display content based on layout information corresponding to the one or more identified areas.

14. The display case of claim 13, wherein the layout information includes information identifying at least one of the dimensions of each storage area, an object stored within each storage area, and object data of each product.

15. The display case of claim 1, further comprising:
memory,
wherein the processing circuitry is configured to store interaction data corresponding to the identified at least two areas in the memory when one or more objects are detected as passing through the interior of the second frame for a predetermined period of time.

16. The display case of claim 15, wherein the processing circuitry
determines an amount of time in which the one or more objects is detected by the one or more sensors, and
does not store the interaction data corresponding to the identified at least two areas when the amount of time is less than the predetermined amount of time.

17. The display case of claim 1, wherein the display device is located at a rear side of the first frame such that content displayed on the display device is viewed through at least one of the storage areas.

18. The display case of claim 1, wherein the second frame includes a plurality of sensors and light emitting diodes positioned around at least two sides of the perimeter of the second frame.

19. The display case of claim 1, wherein the at least two areas correspond to locations on one or more of the plurality of panels.

20. A method comprising:
detecting, via one or more sensors included on a first frame of an interactive display case affixed within a second frame of the interactive display case and enclosing an interior perimeter of the second frame, when one or more objects pass through the first frame of the interactive display case;
identifying, via processing circuitry based on data from the one or more sensors and in response to one or more objects passing through the first frame, at least two areas within the interior of the first frame in which the one or more respective objects pass, the at least two areas corresponding to one or more storage areas located within a second frame of the interactive display case; and
controlling a display device to display content based on one or more of the identified at least two areas.

21. A non-transitory computer-readable medium having stored thereon computer-readable instructions which when executed by a computer cause the computer to perform a method comprising:
detecting, via one or more sensors included within on a first frame of an interactive display case affixed within a second frame of the interactive display case and enclosing an interior perimeter of the second frame, when one or more objects pass through the first frame of the interactive display case;
identifying, based on data from the one or more sensors and in response to one or more objects passing through the first frame, at least two areas within the interior of the first frame in which the one or more respective objects pass, the at least two areas corresponding to one or more storage areas located within a second frame of the interactive display case; and
controlling a display device to display content based on one or more of the identified at least two areas.

* * * * *